United States Patent
Iska et al.

(10) Patent No.: US 10,972,862 B2
(45) Date of Patent: Apr. 6, 2021

(54) VISITOR INSIGHTS BASED ON HYPER-LOCATING PLACES-OF-INTEREST

(71) Applicant: SafeGraph, Inc., San Francisco, CA (US)

(72) Inventors: Kaushik Iska, San Francisco, CA (US); Tenzing Shaw, San Francisco, CA (US); Andrew Israel, San Francisco, CA (US); Noah Yonack, San Francisco, CA (US)

(73) Assignee: SafeGraph, Inc., San Francisco, CA (US)

( * ) Notice: Subject to any disclaimer, the term of this patent is extended or adjusted under 35 U.S.C. 154(b) by 0 days.

(21) Appl. No.: 16/567,422

(22) Filed: Sep. 11, 2019

(65) Prior Publication Data
US 2020/0068341 A1    Feb. 27, 2020

Related U.S. Application Data

(63) Continuation of application No. 16/112,589, filed on Aug. 24, 2018, now Pat. No. 10,623,889.

(51) Int. Cl.
*H04W 4/021* (2018.01)
*G01C 21/20* (2006.01)
(Continued)

(52) U.S. Cl.
CPC .......... *H04W 4/021* (2013.01); *G01C 21/206* (2013.01); *G01C 21/32* (2013.01); *H04W 4/33* (2018.02)

(58) Field of Classification Search
CPC ...... G01C 21/32; G01C 21/206; G01C 21/30; G01C 21/34; H04W 4/021; H04W 4/33;
(Continued)

(56) References Cited

U.S. PATENT DOCUMENTS 9,602,674 B1  3/2017  Polega et al.
10,489,387 B1  11/2019  Rogynskyy et al.
(Continued)

FOREIGN PATENT DOCUMENTS

KR  10-2013-0082582 A  7/2013
KR  10-2015-0112138 A  10/2015
WO  2020040799 A1  2/2020

OTHER PUBLICATIONS

U.S. Appl. No. 16/112,589—Notice of Allowance dated Jul. 1, 2019, 9 pages.
(Continued)

*Primary Examiner* — Quoc Thai N Vu
(74) *Attorney, Agent, or Firm* — Haynes Beffel & Wolfeld, LLP; Ernest J. Beffel, Jr.; Sikander M. Khan

(57) ABSTRACT

The technology disclosed relates to determining visitor behavior. In particular, it relates to receiving preliminary geospatial coordinates of a plurality of places-of-interest, generating (i) contours of the places-of-interest and (ii) hyper-located geospatial coordinates of centroids of the places-of-interest based on processing the preliminary geospatial coordinates of the places-of-interest, and correlating (i) the contours and (ii) the hyper-located geospatial coordinates of the centroids of the places-of-interest with geospatial coordinates of visitor locations to determine the visitor behavior of visitors visiting the places-of-interest, including at least one of detecting whether the visitors visited the places-of-interest, and detecting a duration for which the visitors visited the places-of-interest.

18 Claims, 18 Drawing Sheets

(51) Int. Cl.
*H04W 4/33* (2018.01)
*G01C 21/32* (2006.01)

(58) Field of Classification Search
CPC .... H04W 4/206; G01S 19/42; G06F 17/5004; G06F 17/509
See application file for complete search history.

(56) References Cited

U.S. PATENT DOCUMENTS

| | | | |
|---|---|---|---|
| 2004/0008225 A1 | 1/2004 | Campbell | |
| 2007/0265781 A1 | 11/2007 | Nemethy et al. | |
| 2009/0327314 A1 | 12/2009 | Kim et al. | |
| 2012/0162225 A1 | 6/2012 | Yang et al. | |
| 2012/0166403 A1 | 6/2012 | Kim et al. | |
| 2012/0166611 A1 | 6/2012 | Kim et al. | |
| 2012/0316963 A1* | 12/2012 | Moshfeghi | G06Q 20/327 705/14.58 |
| 2013/0342565 A1* | 12/2013 | Sridhara | G01C 21/206 345/629 |
| 2014/0280180 A1* | 9/2014 | Edecker | G06F 16/9535 707/740 |
| 2014/0304262 A1 | 10/2014 | Makki et al. | |
| 2015/0149659 A1 | 5/2015 | Emadzadeh et al. | |
| 2017/0031920 A1 | 2/2017 | Manning et al. | |
| 2017/0052958 A1 | 2/2017 | Manning et al. | |
| 2017/0351717 A1 | 12/2017 | Kabra et al. | |
| 2018/0129938 A1 | 5/2018 | Xiong et al. | |
| 2018/0182381 A1 | 6/2018 | Singh et al. | |
| 2018/0268253 A1 | 9/2018 | Hoffman et al. | |

OTHER PUBLICATIONS

PCTUS2018052032—International Search Report and Written Opinion dated May 24, 2019, 13 pages.
U.S. Appl. No. 16/112,589—Notice of Allowance dated Nov. 22, 2019, 12 pages.
PCT/US2018/066894—International Search Report and Written Opinion dated Sep. 6, 2019, 9 pages.
Spyrou et al., "Analyzing Flickr metadata to extract location-based information and semantically organize its photo content," Neurocomputing, vol. 172, pp. 114-133, Jan. 8, 2016.
Van den Assem, D. C. F., "Predicting Periodic and Chaotic Signals using Wavenets", Aug. 18, 2017, 90 pages.
Chen, Tianqi, el al., "XGBoost: A Scalable Tree Boosting System", ACM SIGKDD Conference of Knowledge Discover and Data Mining, Aug. 13-17, 2016, 10 pages.
U.S. Appl. No. 16/216,930—Office Action dated May 18, 2020, 28 pages.

* cited by examiner

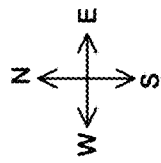
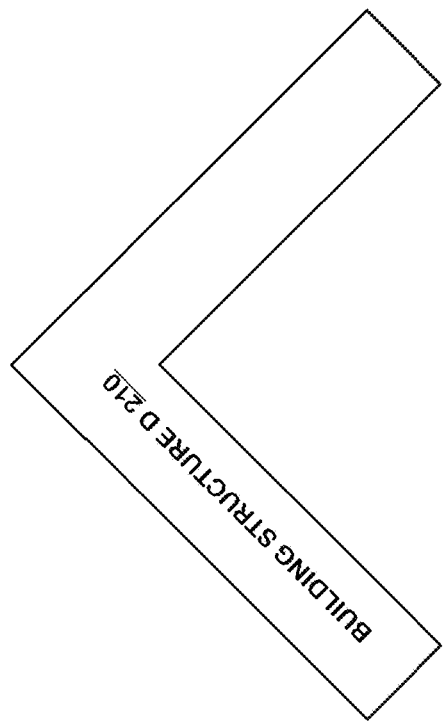
FIG. 7A — BUILDING STRUCTURE A 204
FIG. 7B — BUILDING STRUCTURE B 206
FIG. 7C — BUILDING STRUCTURE C 208
FIG. 7D — BUILDING STRUCTURE D 210

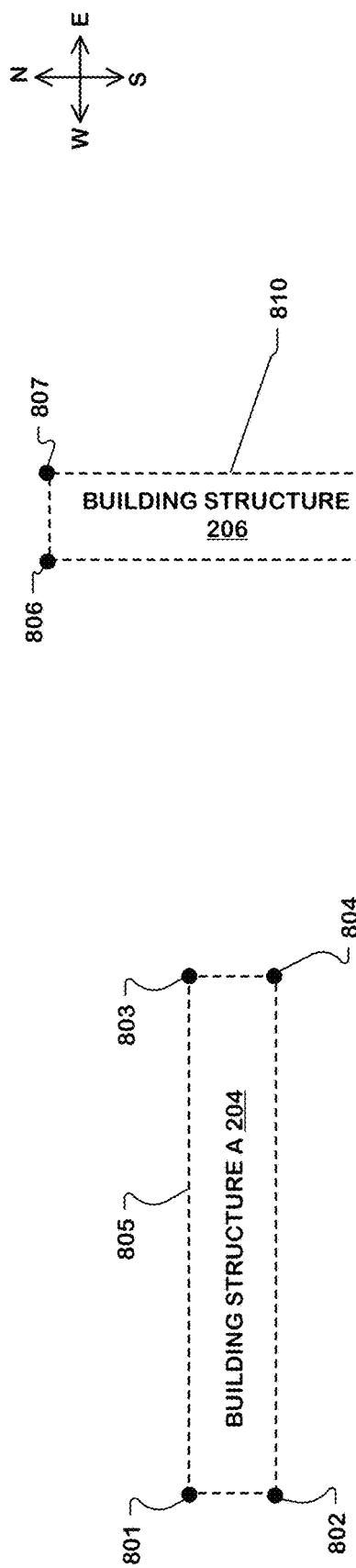
FIG. 8A
FIG. 8B
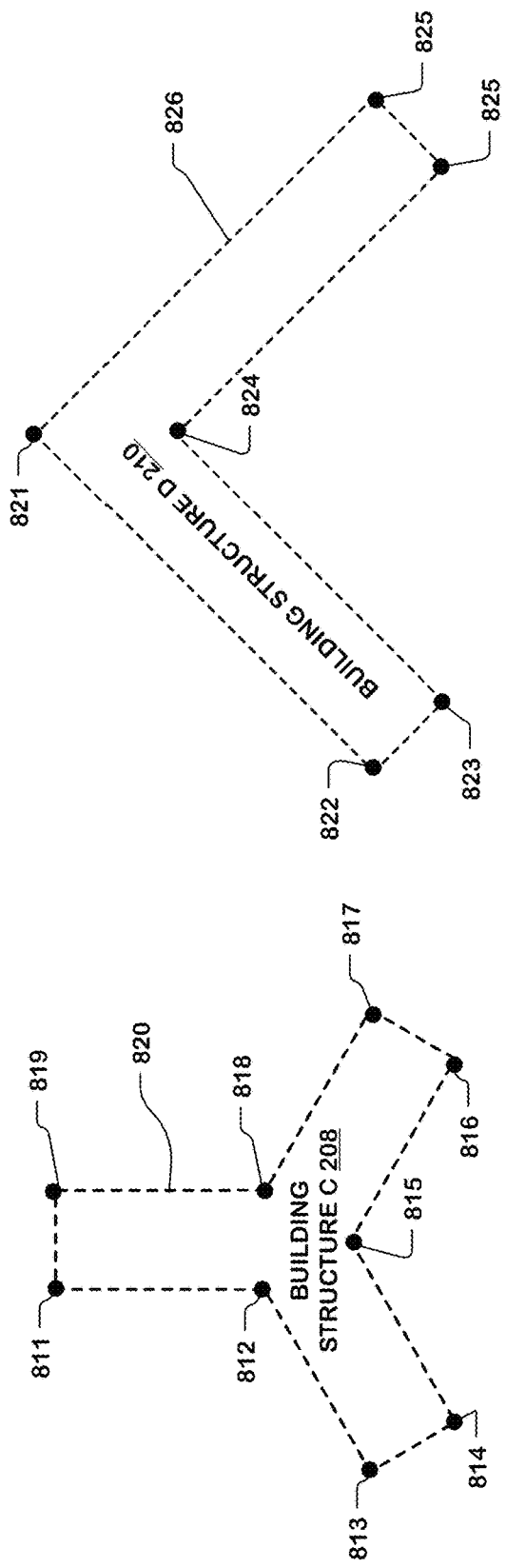
FIG. 8C
FIG. 8D

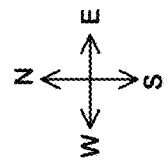
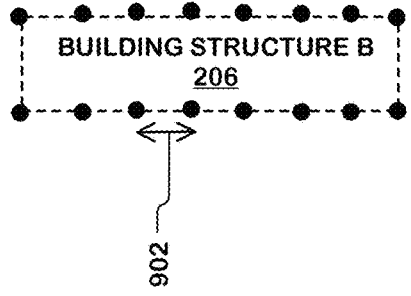
FIG. 9B
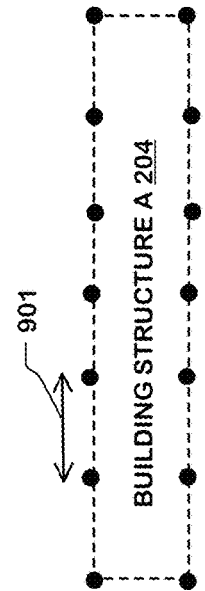
FIG. 9A
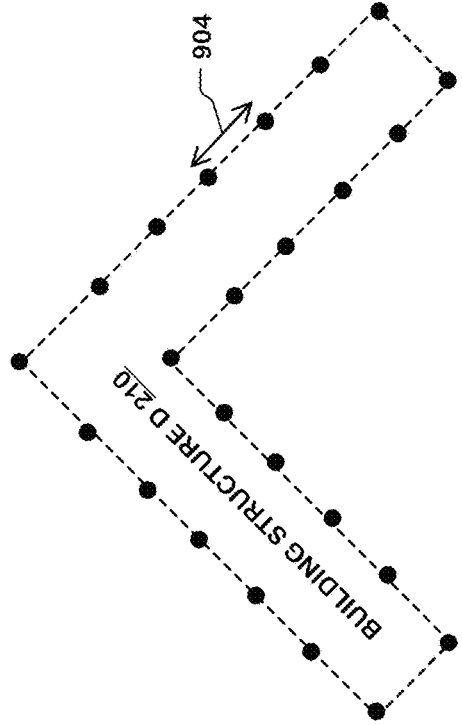
FIG. 9D
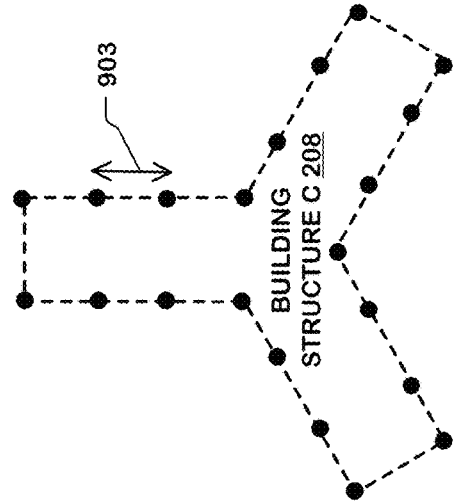
FIG. 9C

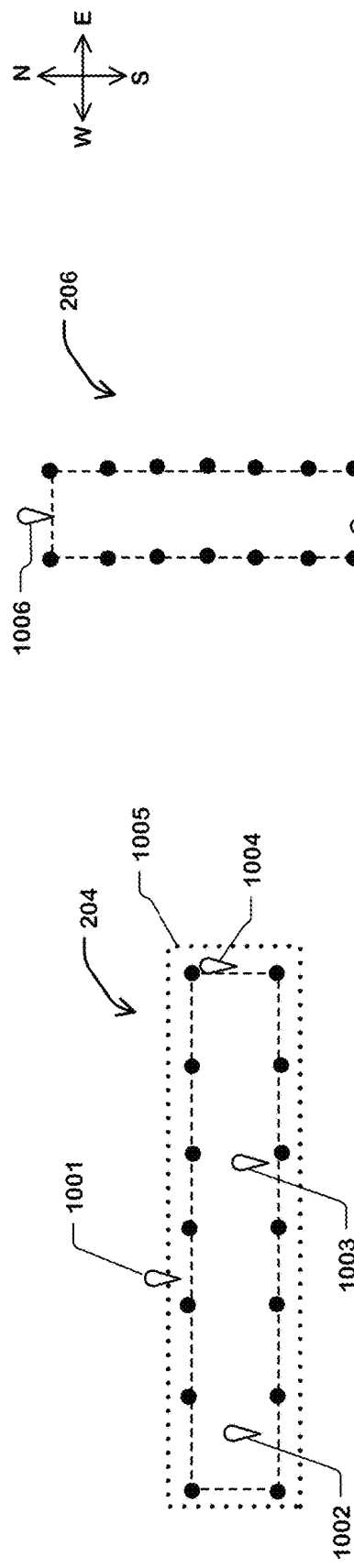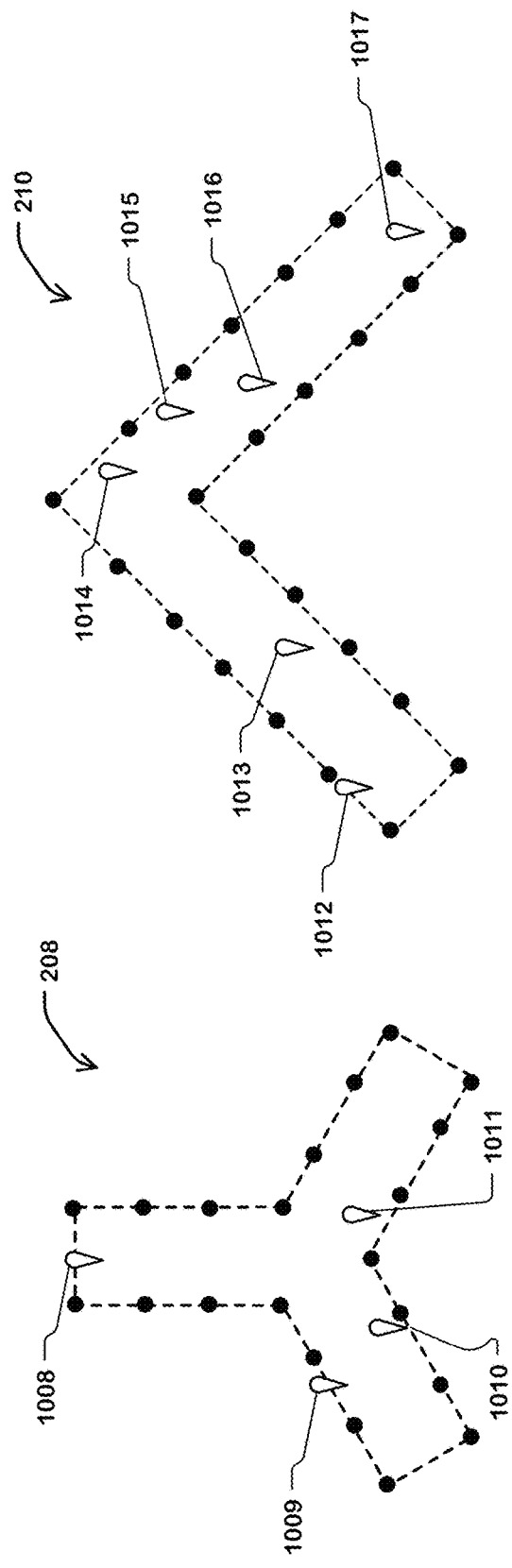

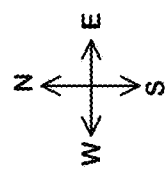
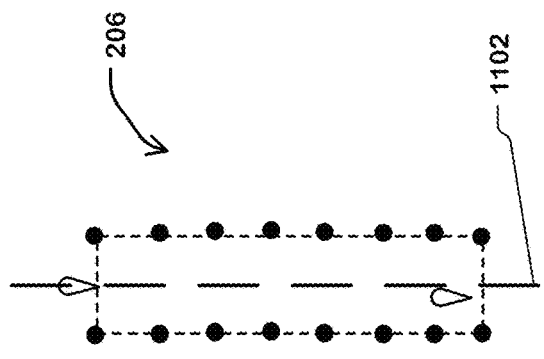
FIG. 11B
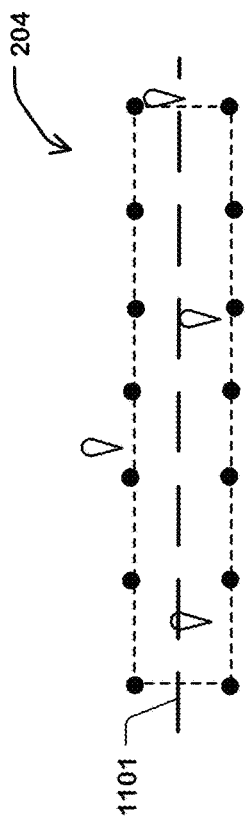
FIG. 11A

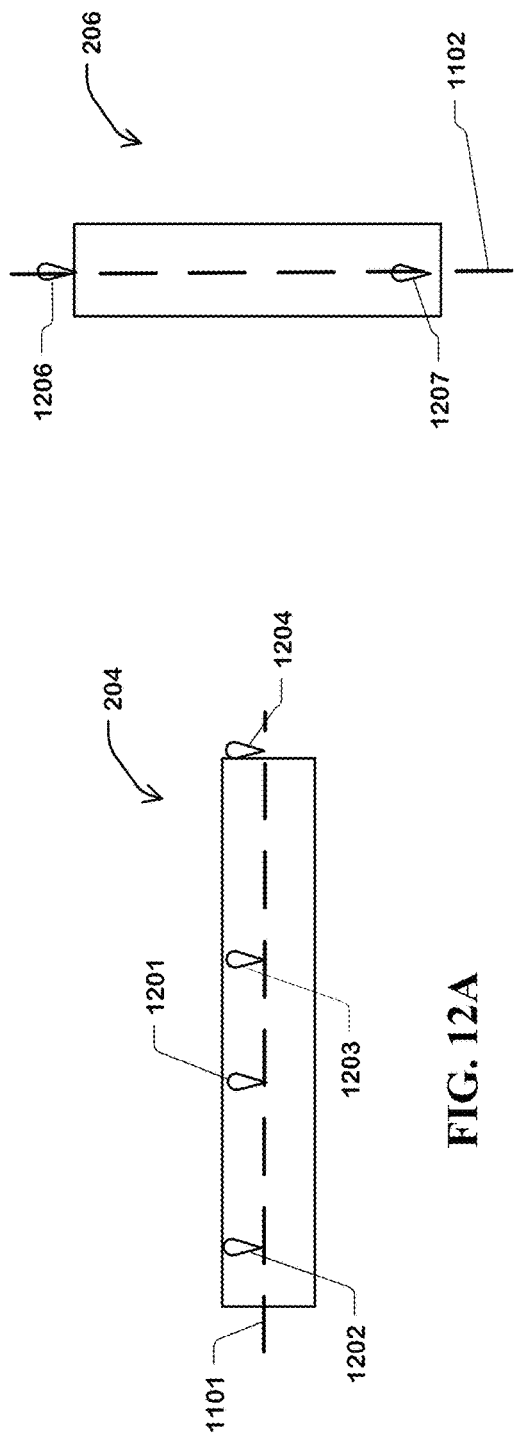
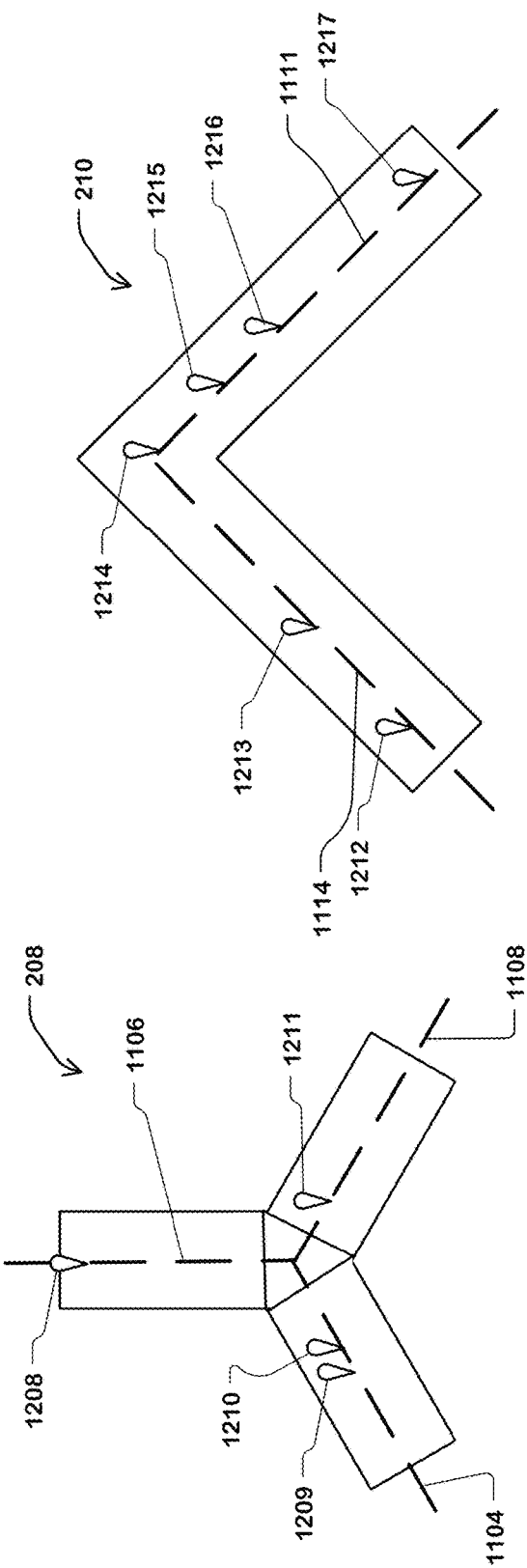
FIG. 12A
FIG. 12B
FIG. 12C
FIG. 12D

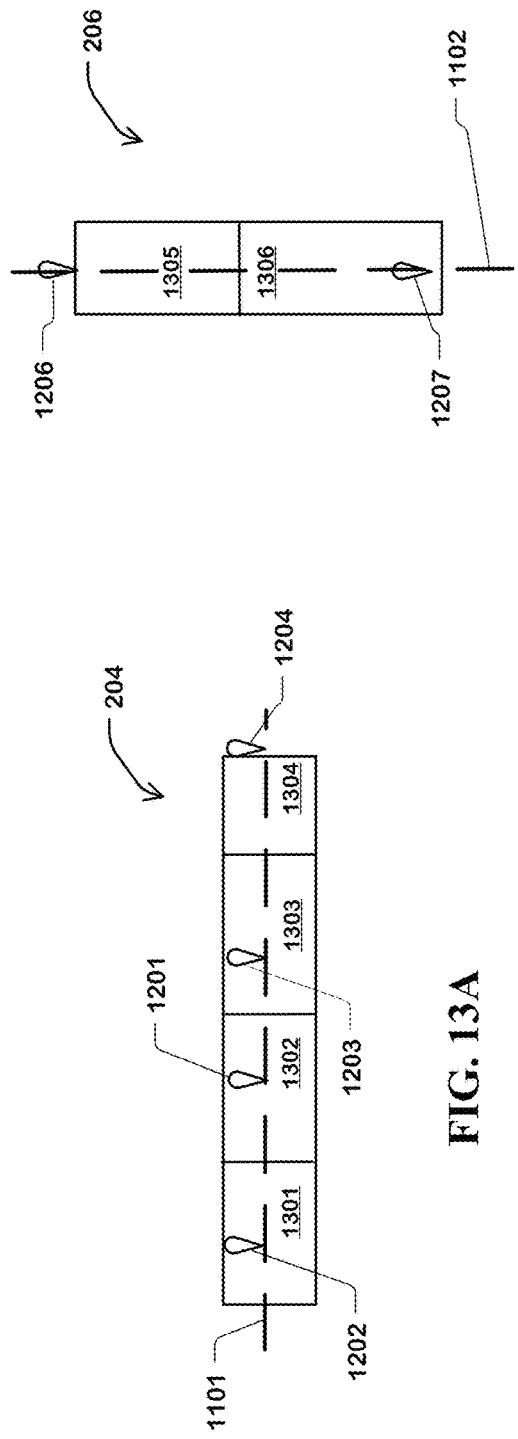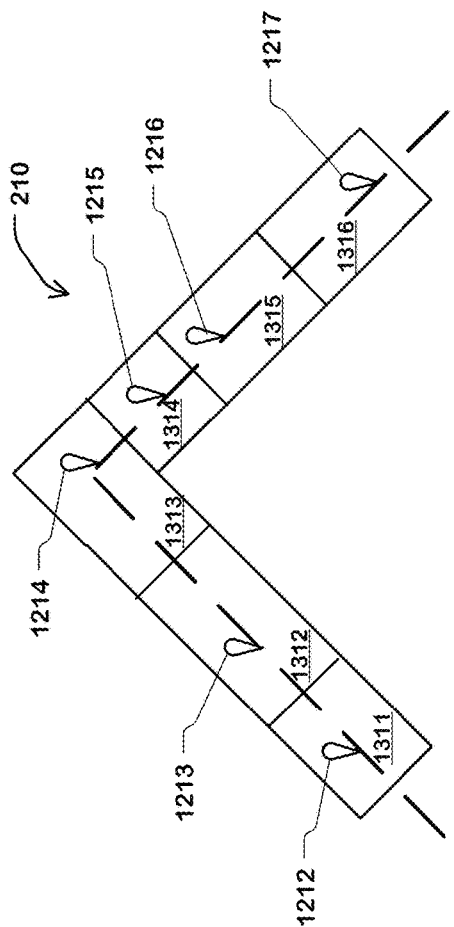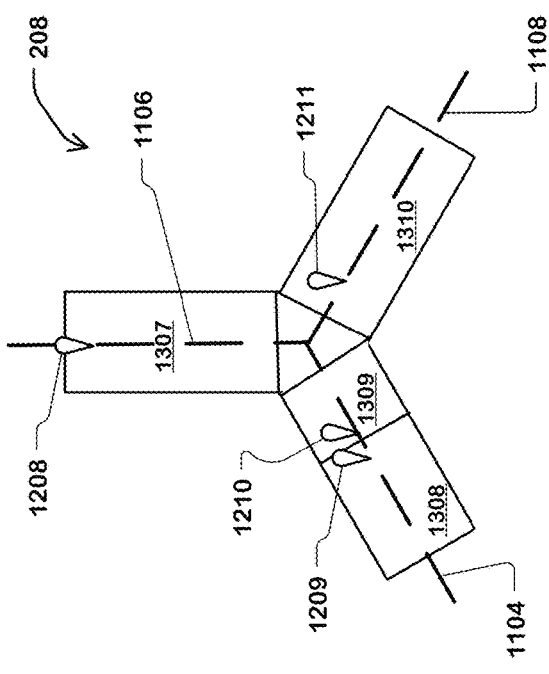
FIG. 13A
FIG. 13B
FIG. 13C
FIG. 13D

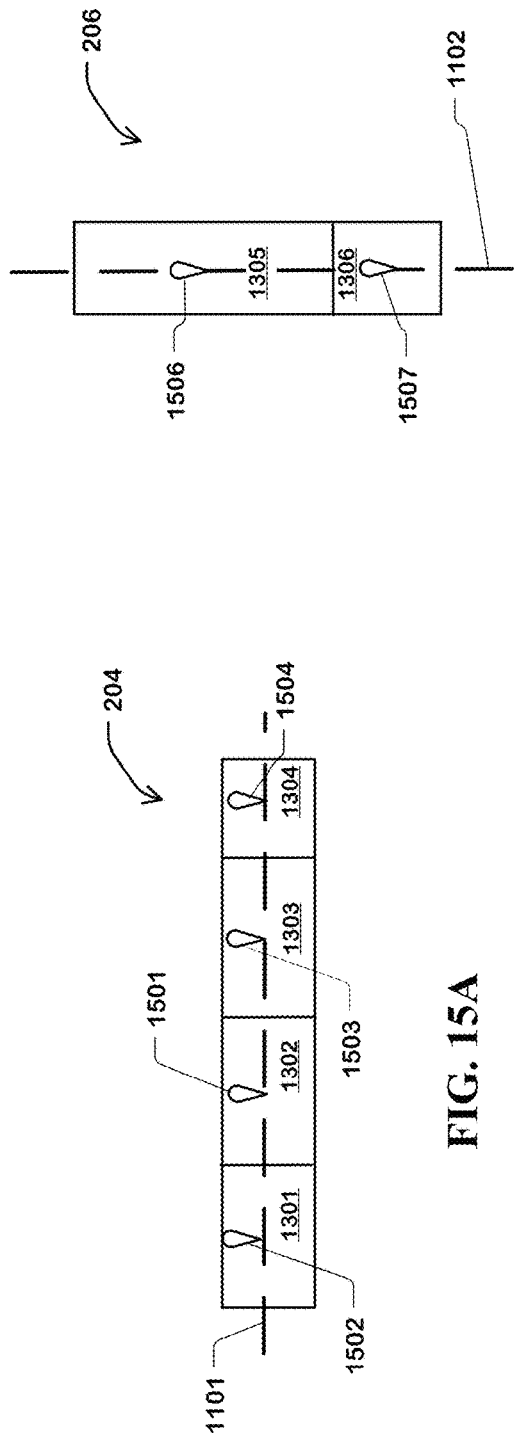
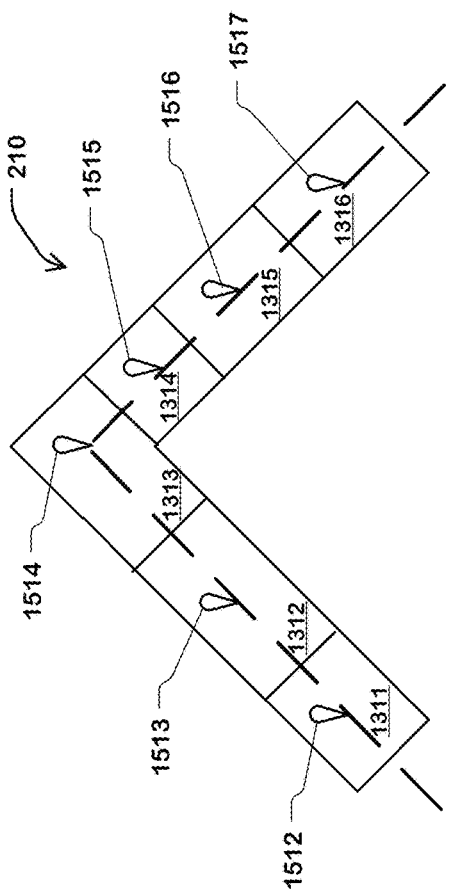
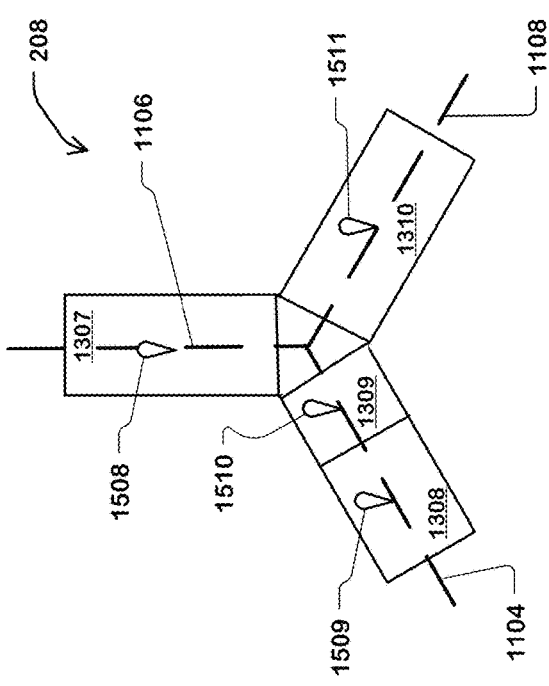
FIG. 15A
FIG. 15B
FIG. 15C
FIG. 15D

VISITOR INSIGHTS BASED ON HYPER-LOCATING PLACES-OF-INTEREST

RELATED APPLICATIONS

This application is a continuation of U.S. patent application Ser. No. 16/112,589, entitled "HYPER-LOCATING PLACES-OF-INTEREST IN BUILDINGS," filed Aug. 24, 2018. The non-provisional application is hereby incorporated by reference for all purposes.

FIELD OF THE TECHNOLOGY

The present invention relates to estimating accurate geospatial coordinates for places-of-interest, and more particularly, to estimating accurate geospatial coordinates and defining boundaries for places-of-interest in buildings with multiple places-of-interest.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Traditional methods for studying visitors' behavior at a given place-of-interest (e.g., businesses, schools, town halls, distinctive buildings, post offices, restaurants, tourist attractions, etc.), such as surveys and manual collection, are expensive, time-consuming and cannot be easily applied at a large scale. However, in recent years, data from personal devices with location sensing capabilities, such as smartphones and wearable devices, have emerged as new sources for studying visitors' behavior. The location-specific data from visitor personal devices can be exploited by data mining algorithms to discover knowledge patterns that may be helpful for smarter planning in long-term business strategy and development. The patterns can be used to have a better understanding of the visitor traffic over time at a particular place-of-interest. The patterns may also help to pinpoint the best location for a particular brand of business, study land or rental prices of commercial and residential locations, and provide location-specific advertising. The knowledge patterns will also allow urban planners and developers the ability to find solutions for problems that require analyzing location-specific data, such as, the ideal street for a bike-share location, or reconfiguring roadways for optimal traffic flow.

A place-of-interest is generally associated with a centroid that specifies, at a minimum, geospatial coordinates of the place-of-interest (i.e., the latitude and the longitude). However, the data gathered by relying on centroids has low accuracy. The circular mapping of the centroid may not represent the actual perimeter of the place-of-interest. If one or more places-of-interest are nearby, such as multiple places-of-interest in one building structure, the circular mappings of their centroids may overlap. The overlapping may result in noisy location-specific data. Furthermore, a centroid of a place-of-interest may not be at the center of the location, and the circular mapping of the centroid may overlap with visitor traffic outside the perimeter of the place-of-interest.

An opportunity arises to leverage places-of-interest that are currently available, improve their centroid so that the improved centroid represents the center of the location, and define their physical perimeter in buildings that may be shared by multiples places-of-interest.

BRIEF DESCRIPTION OF THE DRAWINGS

FIGS. 7A, 7B, 7C 7D, 8A, 8B, 8C, 8D, 9A, 9B, 9C, 9D, 10A, 10B, 10C, 10D, 11A, 11B, 11C, 11D, 12A, 12B, 12C, 12D, 13A, 13B, 13C, 13D, 14, 15A, 15B, 15C, and 15D illustrate examples of building structures useful for explaining the process flow of the hyper-locating system to identify accurate geospatial coordinates for adjusted places-of-interest.

DETAILED DESCRIPTION

Figure 1:
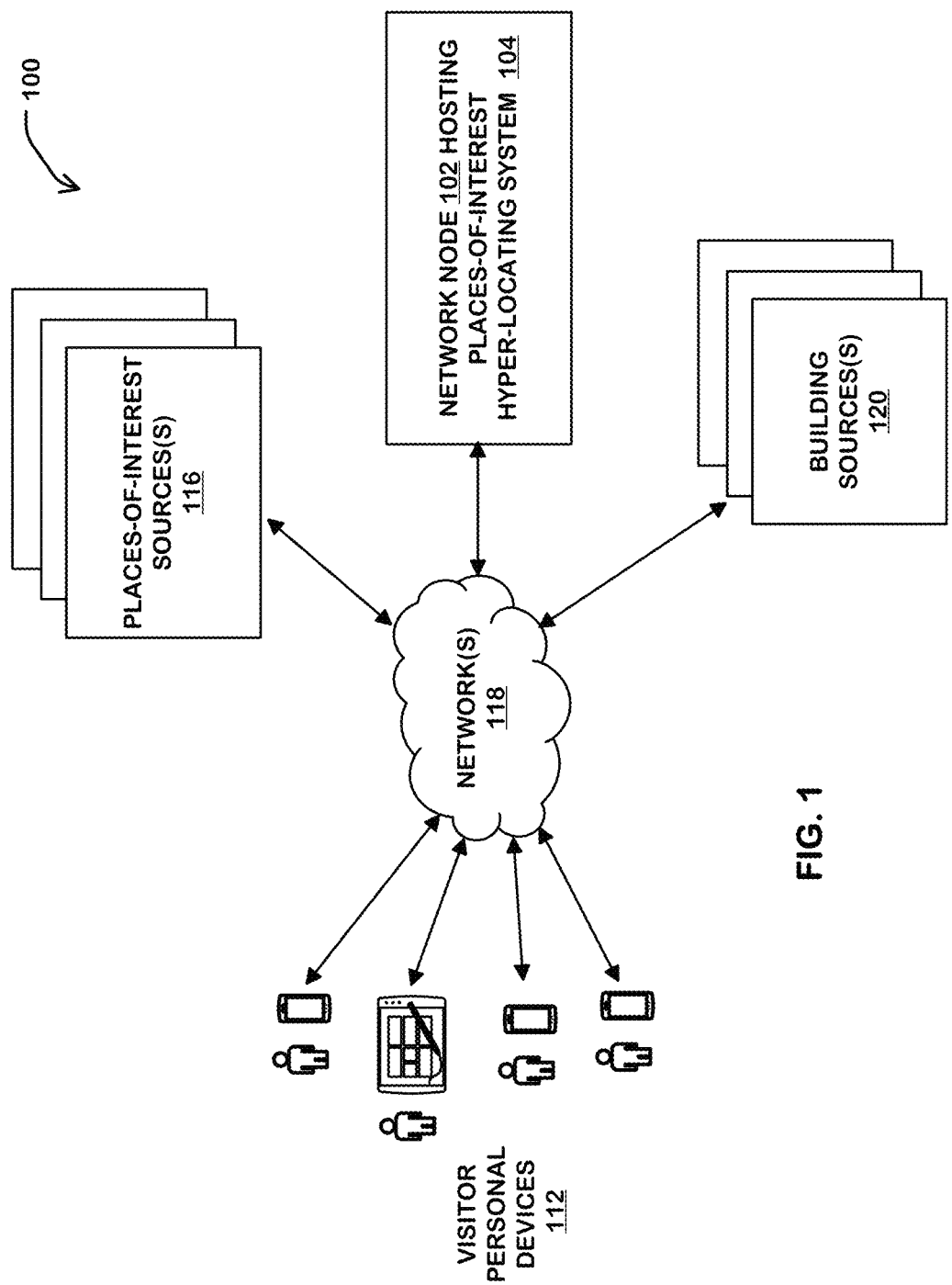
FIG. 1 illustrates an architectural level schematic of an environment that includes a hyper-locating system for places-of-interest in accordance with an implementation.

The following detailed description is made with reference to the figures. Example implementations are described to illustrate the technology disclosed, not to limit its scope, which is defined by the claims. Those of ordinary skill in the art will recognize a variety of equivalent variations on the description that follows.

Introduction

The rapid adoption of personal devices with location sensing capabilities, such as smartphones and tablets, has resulted in a high volume of location-specific data. The location-specific data have detailed knowledge of the personal device users current, past or future locations with demographics, social behavior, and visitation patterns. The location-specific data from a particular business location tagged as a "place-of-interest" includes information about visitor traffic and movement over time in that particular place-of-interest. Businesses that occupy the particular location can study the location-specific data to plan future business strategy and development. Therefore, it is essential that the location-specific data to be analyzed is accurate.

Data for a place-of-interest can be gathered with respect to a "centroid" associated with said place-of-interest. A centroid specifies geospatial coordinates of a place-of-interest (i.e., the latitude and the longitude) in the global map. The place-of-interest may also include a name associated with the place-of-interest, a description (e.g., restaurant, bank, retail shop), an address, times of operation, a telephone number and/or a website link. A centroid does not specify the physical boundary of the place-of-interest it represents. Location-specific data for the place-of-interest can be gathered within a certain radius of the centroid. However, such gathered data will be less accurate than data gathered within the physical boundary of the place-of-interest. Furthermore, centroids, especially the ones obtained through IP addresses, have a large margin of error which in turn introduces more inaccuracy in the location-specific data gathered through the error-prone centroids.

Multiple places-of-interest inside a building structure further complicates the process of gathering location-specific data. The areas defined by the centroids associated with the places-of-interest inside the building structure may overlap, thereby introducing another level of inaccuracy in the data. For example, the location-specific data for one particular place-of-interest in the building structure may be used for business decisions of another place-of-interest situated in the same building structure.

The technology disclosed applies to "hyper-locating" the geospatial coordinates of the places-of-interest within a building structure to the centers of the places-of-interest. The process of hyper-locating increases the positional accuracy of the centroids associated with the places-of-interest. The technology disclosed further defines blocks in the building structures, and associates the places-of-interest to the defined blocks. A block outlines the physical boundary of the associated place-of-interest inside the building structure. Any data gathered within the physical boundary of the block will be specific to the place-of-interest associated with the block. Therefore, location-specific data gathered with the help of the hyper-located geospatial coordinates of the places-of-interest centroids and outlined blocks can have a higher level of accuracy than the data gathered through just centroids.

System Overview

FIG. 1 illustrates an architectural level schematic of an environment in which an hyper-locating system 104 for places-of-interest is deployed in a network node 102 on the network. Because FIG. 1 is an architectural diagram, certain details are intentionally omitted to improve the clarity of the description. The discussion of FIG. 1 is organized as follows. First, the elements of the figure will be described, followed by their interconnections.

The system 100 includes network nodes associated with visitor personal devices 112, the network(s) 118, multiple places-of-interest sources 116, multiple building sources 120, and a network node 102 hosting a hyper-locating system 104 for places-of-interest. As used herein, a network node is an active electronic device or virtual device that is attached to a network, and is capable of sending, receiving, or forwarding information over a communications channel. Examples of electronic devices which can be deployed as network nodes include all varieties of computers, workstations, laptop computers, handheld computers, and smartphones. Network nodes can be implemented in a cloud-based server system. More than one virtual device configured as a network node can be implemented using a single physical device. For the sake of clarity, only four network nodes associated with visitor personal devices are shown to be connected to the network node 102 hosting the hyper-locating system 104 through the network(s) 118. However, any number of personal devices can be connected to the network node 102 hosting the hyper-locating system 104 through the network(s) 118.

The interconnection of the elements of system 100 will now be described. Network(s) 118 couples the network nodes associated with visitor personal devices 112, the network(s) 118, the places-of-interest sources 116, the building sources 120, and the network node 102 hosting the hyper-locating system 404, all in communication with each other (indicated by solid double-arrowed lines). The hyper-locating system 104 in network node 102 can gather location-specific visitor data through the network nodes associated with visitor personal devices 112 with location-sensing capabilities. Examples of personal devices with location-sensing capabilities include a smartphone, a personal computing (PC) device such as a laptop computer or other PC derivative, a personal digital assistant (PDA), a tablet computer, a mobile internet device, a wearable computer, a smartwatch, other consumer electronic device, or the like.

The personal devices can estimate their locations through beacons (e.g., iBeacons and Senion beacons), communications with one more GPS satellites, proximity to one or more WiFi sources, multilateration of radio signals between several nearby cell towers, IP addresses of the personal devices, and so on.

The actual communication path through the internet can be point-to-point over public and/or private networks. The communications can occur over a variety of networks 118, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

In order for the hyper-locating system 104 in the network node 102 to hyper-locate places-of-interest in a building structure, the system needs to know the shape of the building structure. Such information can be obtained from one or more building sources 120. Examples of building sources include satellite images with an aerial view from satellite imagery providers (e.g., USGS Earth Explorer, Geocento, Harris MapMart, Land Info, Si Imaging Services, Planet, Digital Globe, Airbus, CNES, American EOS, etc.). The shape of a building structure from the aerial view in the images can be translated into a shape datatype, such as Well-Known Text (WKT), GeoJSON, Shapefiles, etc. The shape datatype includes geospatial coordinates of at least the vertices of the building structure shape to represent the 2-D geometry of the building structures on a map. For building structures, the shape is usually a polygon, and the shape datatype lists the longitude and latitude pairs of the vertices of the shape of the building structure. In some implementations, the shape data type can further include geospatial coordinates for additional points along the perimeter of the shape of the building structure. Shapes of building structures can also be obtained from local building departments.

Figure 2:
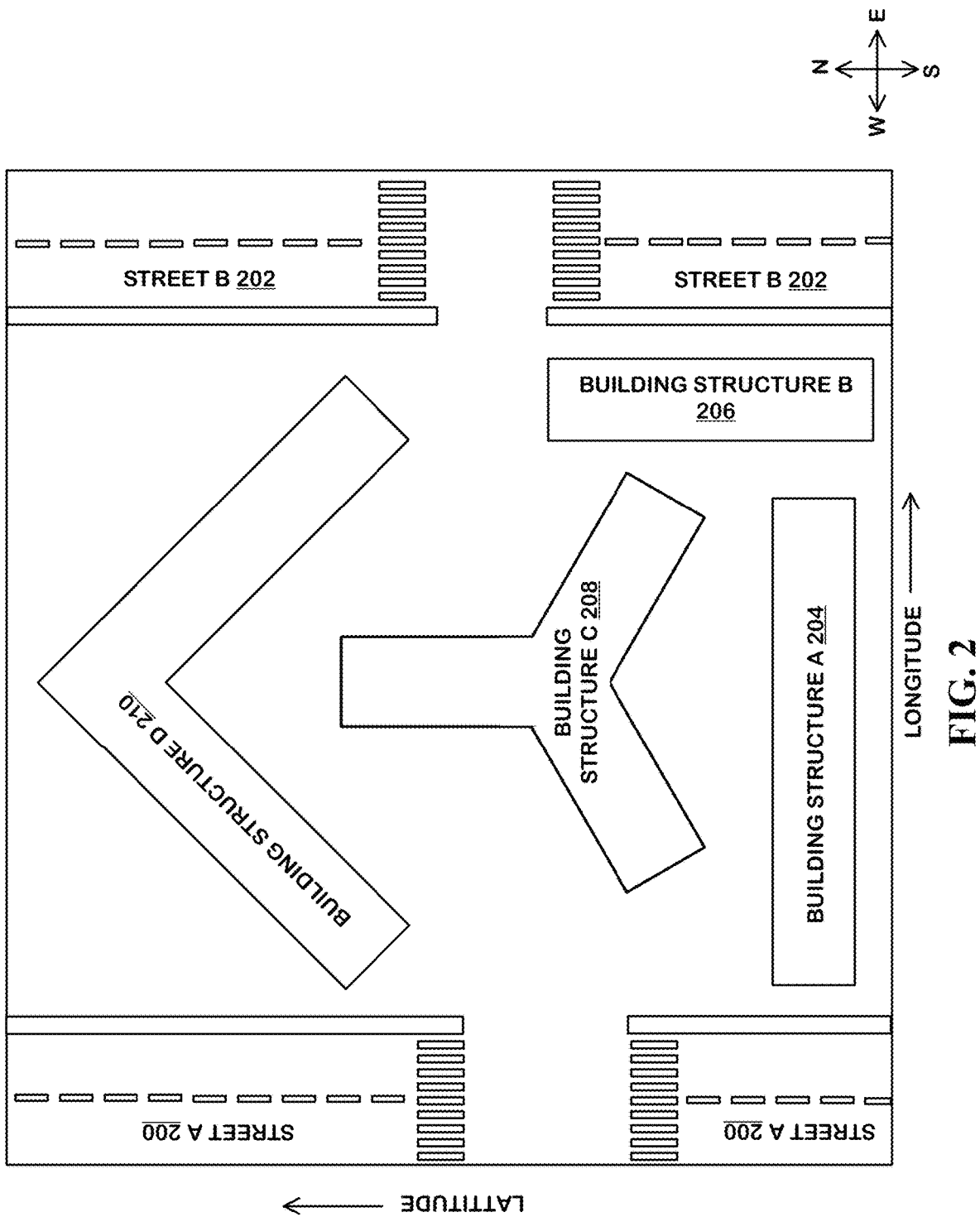
FIG. 2 illustrates example building structures obtained from a building structure source.

FIG. 2 illustrates example building structures obtained from an image from a building structure source. A geographic grid (i.e., longitude represents East-West direction, and latitude represents North-South direction) specifies the geospatial positions of the different components in the image in FIG. 2. The image includes shape information for four building structures between street A 200 and street B 202. The four building structures are: (i) a rectangular building structure A 204, (ii) a rectangular building structure B 206, (iii) a Y-shaped building structure C 208, and (iv) an L-shaped building structure D 210. The technology disclosed will be described with the four building structures in FIG. 2. For the sake of clarity, only rectangular, Y and L-shaped building structures are used as examples. However, any building shape can be used by the technology described herein.

Referring to FIG. 1, the hyper-locating system 104 in the network node 102 also obtains data on various places-of-interest through one or more places-of-interest sources 116. The place-of-interest for a certain business location includes geospatial coordinates of a location, a name for the business located in the place-of-interest, a description, an address, times of operation, telephone and/or website link. Places-of-interest can be obtained from multiple sources in any one of the following formats: ASCII Text (.asc .txt .csv .plt), Topografix GPX (.gpx), Garmin Mapsource (.gdb), Google Earth Keyhole Markup Language (.kml .kmz), Pocket Street Pushpins (.psp), Maptech Marks (.msf), Maptech Waypoint (.mxf), Microsoft MapPoint Pushpin (.csv), OziExplorer (.wpt), TomTom Overlay (.ov2) and TomTom plain text format (.asc), OpenStreetMap data (.osm), etc. Examples of building sources include GoogleMaps, Yelp, Pitney Bowes, Factual, FOAM, LeadsDeposit, etc.

Figure 3:
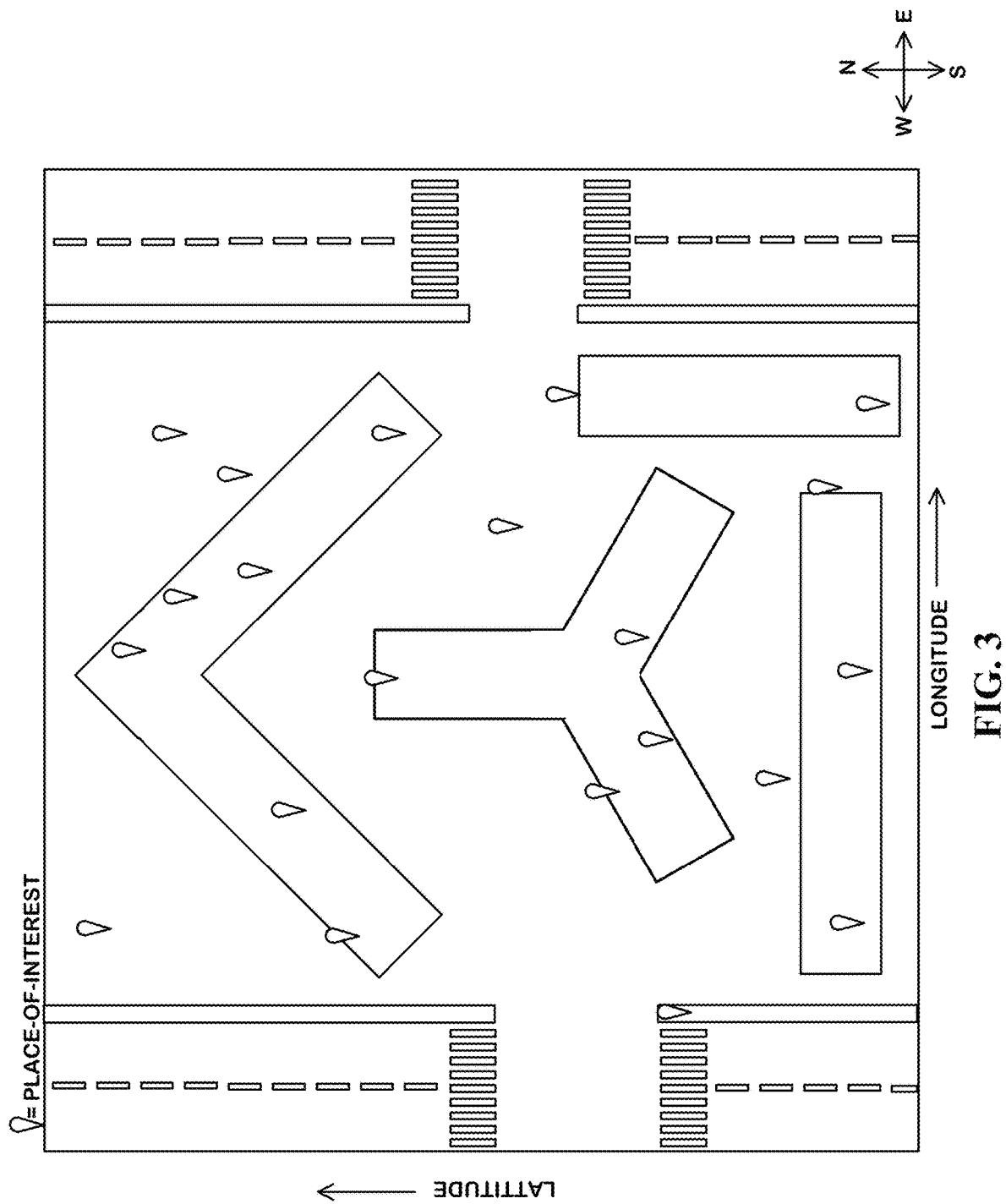
FIG. 3 illustrates example preliminary places-of-interest obtained from places-of-interest sources in the vicinity of the building structures in FIG. 2.

FIG. 3 illustrates example preliminary places-of-interest obtained in the vicinity of the four building structures in FIG. 2. Each place-of-interest is associated with its own geospatial coordinates. The plurality of places-of-interest in FIG. 2 may be obtained from one places-of-interest source or multiple places-of-interest sources.

Hyper-Locating System for Places-of-Interest

Figure 4:
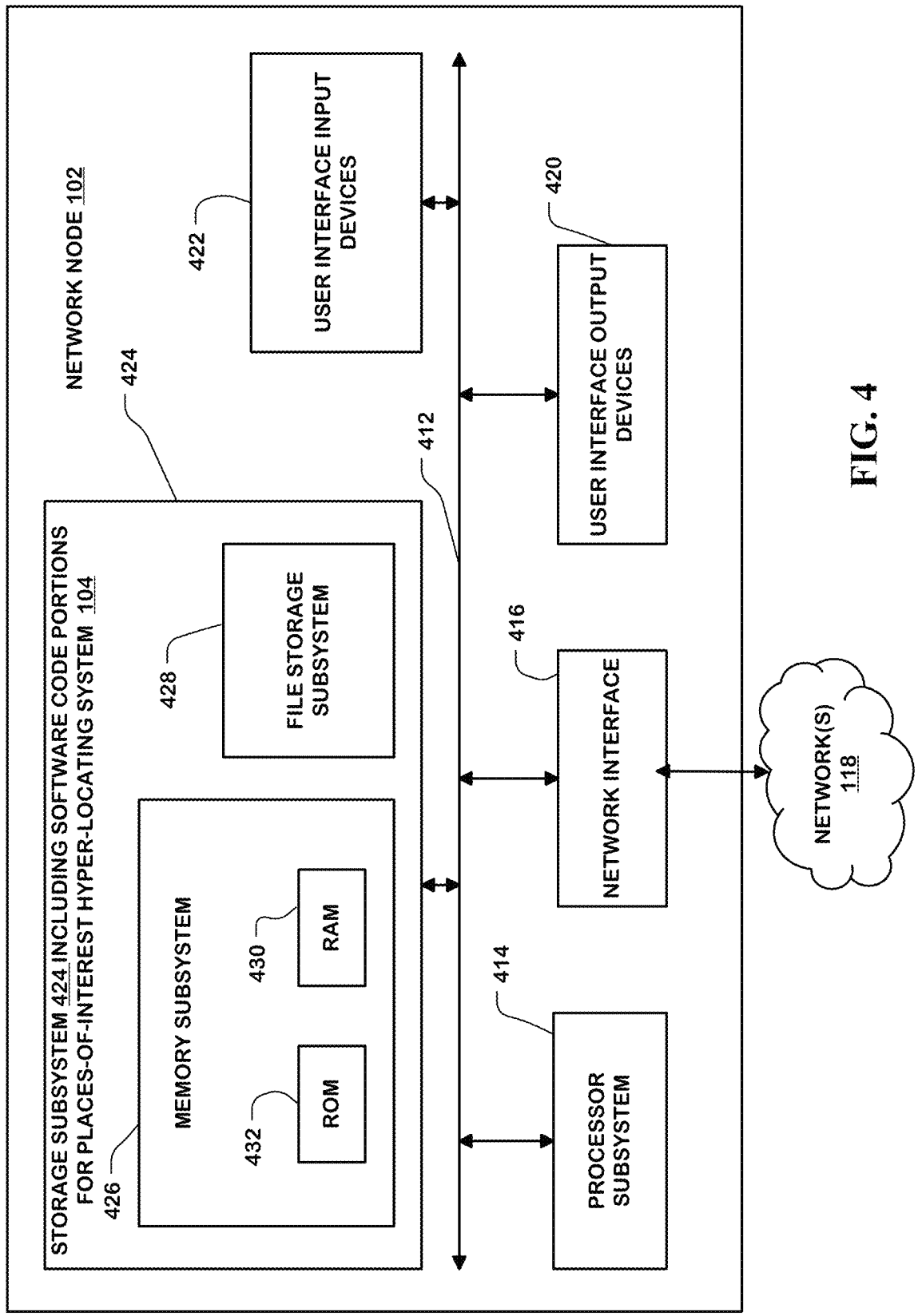
FIG. 4 is a simplified block diagram of a network node hosting a hyper-locating system.

FIG. 4 is a simplified block diagram of a network node 102 that can be used to implement the hyper-locating system 104 for places-of-interest. Network node 102 typically includes an operating system executed by a processor subsystem 414 which communicates with a number of peripheral devices via bus subsystem 412. These peripheral devices may include a storage subsystem 424, comprising a memory subsystem 426 and a file storage subsystem 428, user interface input devices 422, user interface output devices 420, and a network interface subsystem 416. The input and output devices allow user interaction with network node 102. Network interface subsystem 416 provides an interface to outside network 118 and is coupled via network 118 to other elements in system 100. The physical hardware components of network interfaces are sometimes referred to as network interface cards (NICs), although they need not be in the form of cards; for instance they could be in the form of integrated circuits (ICs) and connectors fitted directly onto a motherboard, or in the form of macrocells fabricated on a single integrated circuit chip with other components of the computer system.

User interface input devices 422 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into network node 102 or onto network 118.

User interface output devices 420 may include a display subsystem, a printer, a fax machine, or nonvisual displays such as audio output devices. The display subsystem may include a cathode ray tube (CRT), a flat-panel device such as a liquid crystal display (LCD), a projection device, or some other mechanism for creating a visible image. The display subsystem may also provide a nonvisual display such as via audio output devices. In general, use of the term "output device" is intended to include all possible types of devices and ways to output information from network node 102 to the user or another machine or network node. In particular, an output device of the network node 102 on which the hyper-locating system 104 is implemented, may include a visual output informing a user of action recommendations made by the system, or may include a communication device for communicating action signals.

Storage subsystem 424 stores the basic programming and data constructs that provide the functionality of certain implementations of the present invention. For example, the various modules implementing the functionality of certain implementations of the invention may be stored in storage subsystem 424. These software modules are generally executed by processor subsystem 414.

Memory subsystem 426 typically includes a number of memories including a main random access memory (RAM) 430 for storage of instructions and data during program execution and a read-only memory (ROM) 432 in which fixed instructions are stored. File storage subsystem 428 provides persistent storage for program and data files, and may include a hard disk drive, a floppy disk drive along with associated removable media, a CD ROM drive, an optical drive, or removable media cartridges. The databases and modules implementing the functionality of certain implementations of the invention may have been provided on a computer-readable medium such as one or more CD-ROMs, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed. The databases and modules implementing the functionality of certain implementations of the invention may also be stored by file storage subsystem 428. The host memory subsystem 426 contains, among other things, computer instructions which, when executed by the processor subsystem 414, cause the computer system to operate or perform functions as described herein. As used herein, processes and software that are said to run in or on "the host", "the computer" or "the network", execute on the processor subsystem 414 in response to computer instructions and data in the host memory subsystem 426 including any other local or remote storage for such instructions and data.

Bus subsystem 412 provides a mechanism for letting the various components and subsystems of network node 102 communicate with each other as intended. Although bus subsystem 412 is shown schematically as a single bus, alternative implementations of the bus subsystem may use multiple busses.

The network node 102 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of network node 102 depicted in FIG. 4 is intended only as a specific example for purposes of illustrating the preferred implementations of the present invention. Many other configurations of the network node 102 are possible having more or less components than the system depicted in FIG. 4.

In some implementations, the hyper-locating system 104 for places-of-interest can be implemented in the network node 102 as a Software-as-a-Service (SaaS) application, a web-architected application or a cloud-delivered service. Examples of common SaaS applications today include Salesforce.com™, Box™, Dropbox™, Google Apps™, Amazon Web Services AWS™, Microsoft Office 365™, Workday™, Oracle on Demand™, Taleo™, Yammer™, and Concur™. SaaS applications provide functionalities to users that are implemented in the cloud, and that are the target of policies, e.g., logging in, editing user information, updating whitelists, deleting contacts from the contact list, in contrast to the offerings of simple websites and e-commerce sites.

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™, Truviso™, Amazon Elasticsearch Service™, Amazon Web Services™ (AWS), IBM Info-Sphere™, Borealis™, and Yahoo! S4™.

Figure 5:
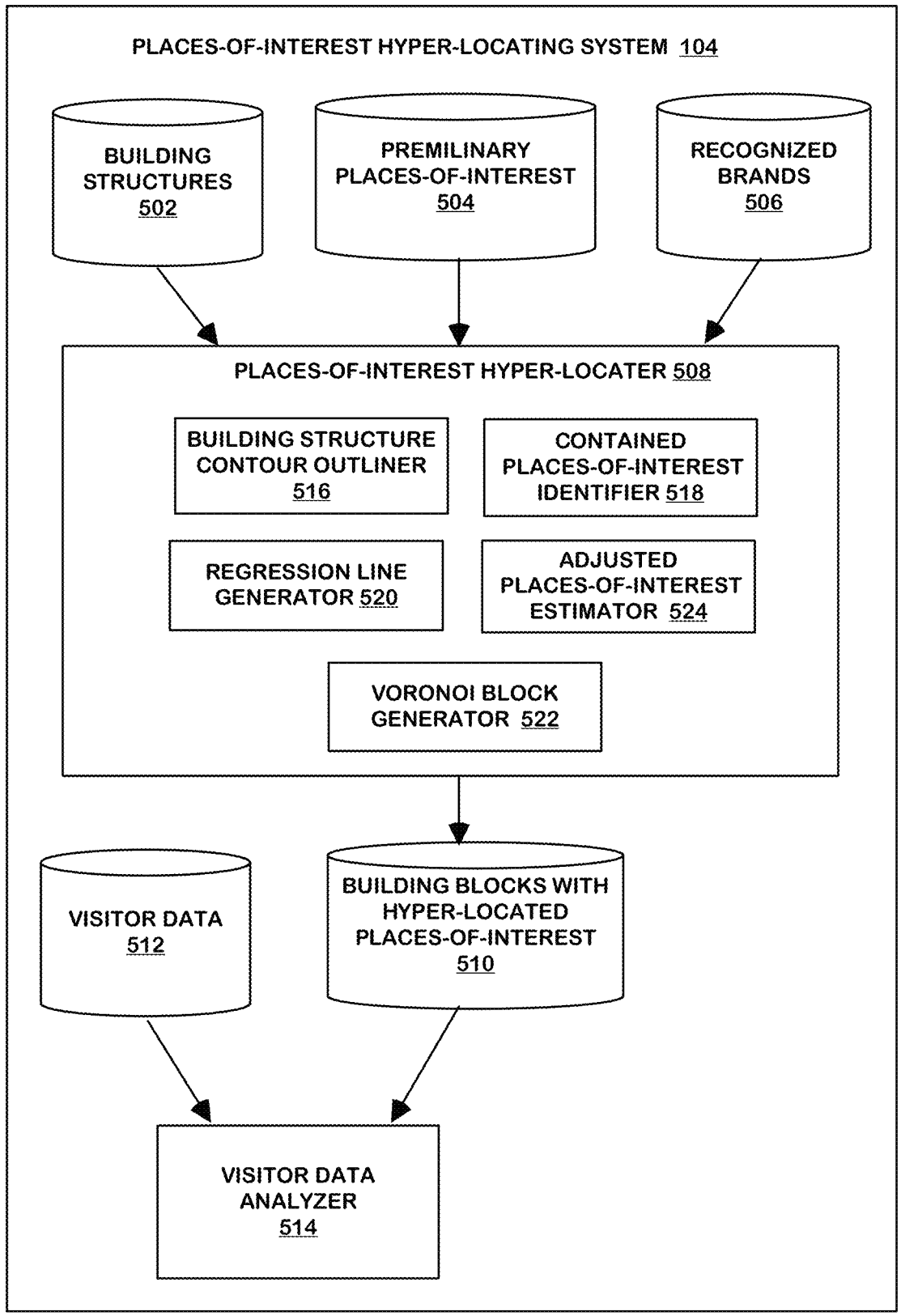
FIG. 5 illustrates an example of a hyper-locating system.

FIG. 5 illustrates an example of a hyper-locating system 104 for places-of-interest. The hyper-locating system 104 includes software components referred to herein as a places-of-interest hyper-locator 508, and a visitor data analyzer 514. The places-of-interest hyper-locator 508 further includes a building structure contour outliner 516, a contained places-of-interest identifier 518, a regression line generator 520, a Voronoi block generator 522, and an adjusted places-of-interest estimator 524.

The hyper-locating system 104 also includes a building structure database 502, a preliminary places-of-interest database 504, a recognized brand database 506, a visitor data database 512, and a building block with hyper-located place-of-interest database 514. As used herein, the term "database" does not necessarily imply any unity of structure. For example, two or more separate databases, when considered together, still constitute a "database" as that term is used herein. Databases can include tables. In some implementations, the building structures and preliminary places-of-interest are stored in separate tables within a single database.

The building structure database 502 may store shape datatypes of building structures obtained from the building sources 120. The shape datatypes can be in the form of Well-Known Text (WKT), GeoJSON or Shapefiles. The shape datatype includes geospatial coordinates of the at least the vertices of the shape of the buildings. In some implementations, the shape data type can further include geospatial coordinates for additional points along the perimeter of the shape of the building structure. In some implementations, the building structure database 502 may store the satellite images from the building sources 120. In some implementations, the building structure database 502 may include other optional information that might be helpful for the functionality of the hyper-locating system 104, e.g., a timestamp of the image used to identify the shape of the building structure, a name of the source of the building structure, the credibility of the source and so on.

The preliminary places-of-interest database 504 stores places-of-interest obtained from the places-of-interest sources 116. The preliminary place-of-interest for a certain business location includes one or more of the following: geospatial coordinates of location, a name for the place-of-interest, any recognized brand the place-of-interest is associated with (e.g., Starbucks, Target, etc.), a category for the place-of-interest according to the North American Industry Classification System (NAICS), a street address, a city, a state, a zip code, times of operation, a telephone number and/or a website link. In some implementations, the building structure database 502 may include other optional information that might be helpful for the functionality of the hyper-locating system 104, e.g., a timestamp of when the place-of-interest was created in the system, a name for the source of the place-of-interest, the credibility of the source and so on.

The recognized brand database 504 contains information regarding well-known brands, such as Starbucks, Walmart, Macy's, T-Mobile, Bank of America, etc. For each of the recognized brands, the recognized brand database 504 contains information regarding the name of the brand, a category according to the North American Industry Classification System (NAICS), a "known" area occupied by a store of that brand, etc. A "known" area occupied by a brand may be the minimum area occupied or the average area occupied. The average area occupied by a recognized brand may be in the range of 50 square meters to 10,000 square meters. For example, the average area occupied by a Macy's store is 2200 square meters, and the average area occupied by a Starbucks store is 195 square meters. The minimum area occupied by a Starbucks store is 46 square meters. In some implementations, the recognized brand database 504 may include other optional information that might be helpful for the functionality of the hyper-locating system 104, e.g., a name for the source used to obtain information about the recognized brand, the credibility of the source and so on.

The visitor data database 512 stores gathered location-specific visitor data from the visitor personal devices 112 with location-sensing capabilities. The location-specific data may have detailed knowledge about locations of the visitors over time and visitation patterns at various business locations. The visitor data database 512 can include one or more of the following: Universal Time Coordinated (UTC) timestamp of the data entry, the latitude and the longitude of the location of the personal device, the Geohash of the latitude and longitude, the accuracy of the location, an ID that uniquely identifies the device, the name of the place-of-interest visited, any recognized associated with the place-of-interest (e.g., Starbucks, Target, etc.), a category for the place-of-interest according to the North American Industry Classification System (NAICS), a street address, a city, a state, a zip code and so on.

The places-of-interest hyper-locater 508 selects a building structure from the building structure database 502 and identifies preliminary places-of-interest from the preliminary places-of-interest database 504 within the boundary of the selected building structure. The places-of-interest hyper-locater 508 estimates the geospatial coordinates of the centers of the places-of-interest within a building structure, thereby increasing the accuracy of the contained places-of-interest. The places-of-interest hyper-locater 508 further defines and associates blocks to the places-of-interest contained in the building structure. A block defines the physical boundary of the associated place-of-interest inside the building structure. Any data gathered within the physical boundary of the block will be specific to the place-of-interest associated with the block. The places-of-interest hyper-locater 508 store the block defined for each place-of-interest along with the hyper-located geospatial coordinates in the building block with hyper-located places-of-interest database 514.

Each hyper-located place-of-interest in the building block with hyper-located place-of-interest database 514 stores information for the hyper-located or corrected geospatial coordinates of the center of the place-of-interest and the shape datatypes for the associated block. The shape datatype can be in the form of Well-Known Text (WKT), GeoJSON or Shapefiles. The shape datatype includes geospatial coordinates of at least the vertices of the block. In some implementations, the shape data type can further include geospatial coordinates for additional points along the perimeter of the block. The building block with hyper-located place-of-interest database 514 can also store one or more of the following for each hyper-located place-of-interest: a name of the hyper-located place-of-interest, any recognized brand the hyper-located place-of-interest is associated with (e.g., Starbucks, Target, etc.), a category for the hyper-located place-of-interest according to the North American Industry Classification System (NAICS), a street address, a city, a state, a zip code, times of operation, a telephone number and/or a website link. In some implementations, the building block with hyper-located place-of-interest database 514 may include other optional information that might be helpful for the functionality of the hyper-locating system 104, e.g., the timestamp of the creation of the hyper-located place-of-interest, a name of the source of the preliminary place-of-interest used to create the hyper-located place-of-interest, the credibility of the source and so on.

The visitor data analyzer 514 analyzes the gathered location-specific visitor data from the visitor data database 512 with respect to the hyper-located geospatial coordinates of the places-of-interest and defined blocks in the building block with hyper-located place-of-interest database 514 to discover knowledge patterns about visitors.

Processing of New Building Structures

Figure 6:
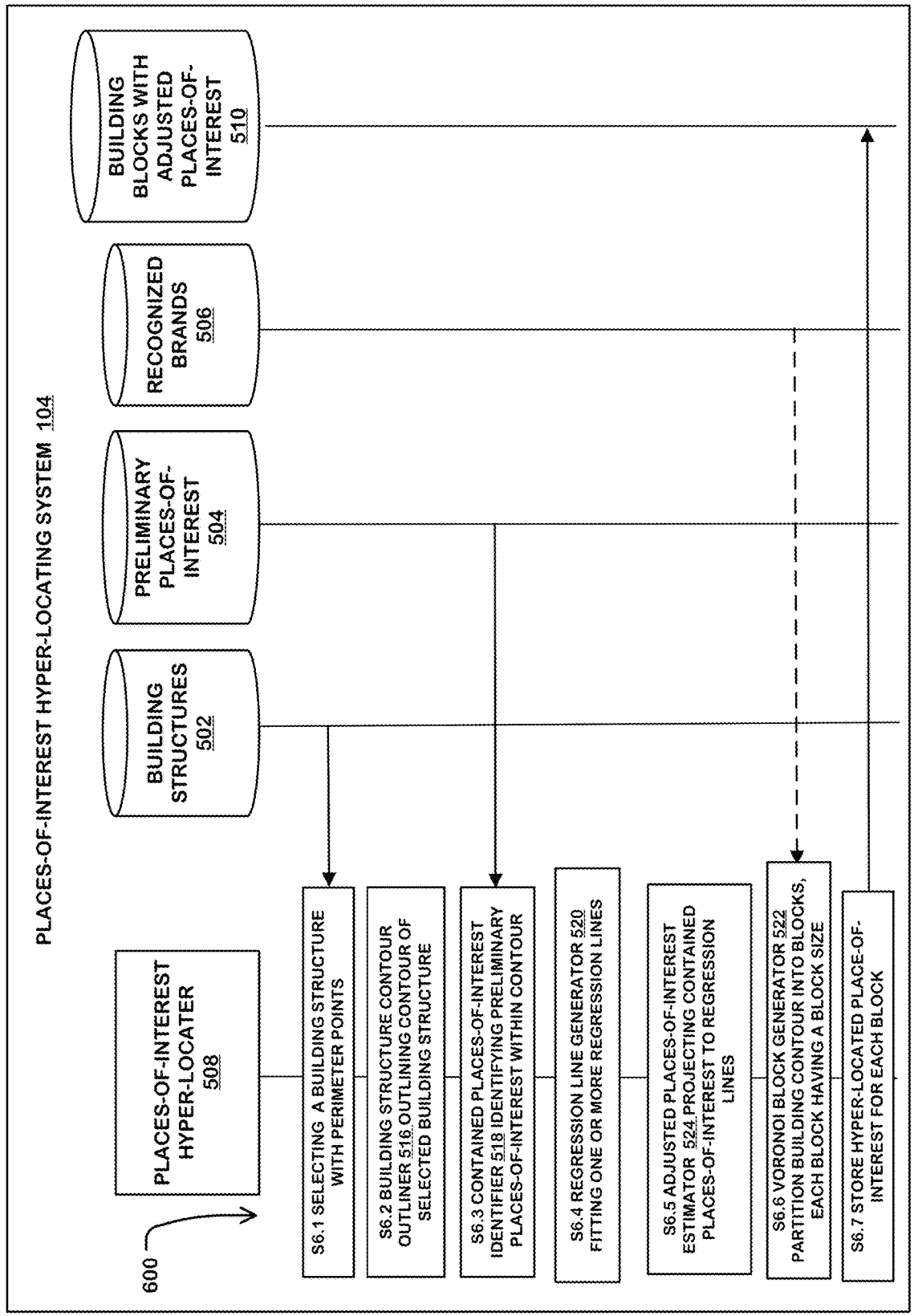
FIG. 6 is a sequence diagram illustrating a representative method of hyper-locating places-of-interest in a building structure by the hyper-locating system.

FIG. 6 is an example workflow 600 illustrating a representative method of hyper-locating places-of-interest in building structures by the places-of-interest hyper-locater 508 in the hyper-locating system 104. In some implementations, the actions in the workflow may be performed in different orders and/or with different, fewer or additional actions than those illustrated in FIG. 6. Multiple actions can be combined in some implementations.

FIG. 6 includes workflow 600 that begins at step S6.1 when the places-of-interest hyper-locater 508 selects building structures from the building structure database 502. In some implementations, the hyper-locating system 104 may receive multiple sets of geospatial coordinates of perimeter points of the same building structure from different building sources, and the places-of-interest hyper-locater 508 may select one set from the multiple sets based on the trustworthiness or credibility of the sources. In some implementations, the hyper-locating system 104 may select a building structure based on the geographic location of the building structure. In some implementations, the hyper-locating system 104 may select a building structure based on a minimum area requirement. In some implementations, the hyper-locating system 104 may select a building structure based on the elevation of the building structure. In some implementations, the hyper-locating system 104 may not select a building structure if there is no places-of-interest in the vicinity of the building structure. In some implementations, the hyper-locating system 104 will not select a building structure if the building structure overlaps with one or more roads.

The workflow 600 is described with the four example building structures identified in FIG. 2. As illustrated in FIG. 7, the four building structures are: (i) the rectangular building structure A 204 (FIG. 7A), (ii) the rectangular building structure B 206 (FIG. 7B), (iii) the Y-shaped building structure C 208 (FIG. 7C), and (iv) the L-shaped building structure D 210 (FIG. 7A).

A plurality of perimeters points defines each selected building structure. The perimeter points are the geospatial coordinates associated with the vertices of the shape of the building structure. In another implementation, in addition to the geospatial coordinates associated with the vertices of the shape of the building structure, the perimeter points includes additional geospatial coordinates along the perimeter of the shape.

FIG. 8 illustrates the perimeter points of the four building structures in FIG. 7. The rectangular building structure A 204 in FIG. 8A has the perimeter points 801, 802, 803 and 804. The rectangular building structure B 206 in FIG. 8B has the perimeter points 806, 807, 808 and 809. The Y-shaped building structure C 208 in FIG. 8C has the perimeter points 811, 812, 813, 814, 815, 816, 817, 818 and 819. The L-shaped building structure D 210 in FIG. 8D has the perimeter points 821, 822, 823, 824 and 825.

Referring to FIG. 6, the workflow 600 continues at step S6.2 where the building structure contour outliner 516 of the places-of-interest hyper-locater 508 outlines a contour of the selected building structure based on geospatial coordinates of perimeter points of the building structure. FIG. 8 illustrates the contours outlined by the building structure contour outliner 516 for the four building structures in FIG. 7. The rectangular building structure A 204 in FIG. 8A has an outlined contour 805 along the perimeter points 801, 802, 803 and 804. The rectangular building structure B 206 in FIG. 8B has an outlined contour 810 along the perimeter points 806, 807, 808 and 809. The Y-shaped building structure C 208 in FIG. 8C has an outlined contour 820 along the perimeter points 811, 812, 813, 814, 815, 816, 817, 818 and 819. The L-shaped building structure D 210 in FIG. 8D has an outlined contour 826 along the perimeter points 821, 822, 823, 824 and 825.

In some implementations, the building structure contour outliner 516 may add geospatial coordinates of additional perimeter points along the distribution of the geospatial coordinates of the perimeter points of the building size with a step size. The step size is the distance between the geospatial coordinates of two perimeter points. The step size may be in the range of 1 to 100 meters. The step size may 20 meters.

FIG. 9 illustrates additional perimeter points added by the building structure contour outliner 516 for the four building structures in FIG. 7. The rectangular building structure A 204 in FIG. 9A has additional perimeter points with the step size 901. The rectangular building structure B 206 in FIG. 9B has additional perimeter points with the step size 902. The Y-shaped building structure C 208 in FIG. 9C has additional perimeter points with the step size 903. The L-shaped building structure D 210 in FIG. 9D has additional perimeter points with the step size 904.

Referring to FIG. 6, the workflow 600 continues at step S6.3 where the contained places-of-interest identifier 518 identifies preliminary places-of-interest within the contours of the selected building structures. As illustrated in FIG. 10, in some implementations, the contained places-of-interest identifier 518 may intersect the places-of-interest shown in FIG. 3 to identify the contained places-of-interested inside the contours of the building structures. As illustrated in FIG. 10A, the contained places-of-interest identifier 518 may further identify preliminary places-of-interest with a certain radius around the geospatial coordinates of the perimeter points as contained places-of-interest. In some implementations, the radius may be in the range of 1 to 100 meters. In some implementations, the radius may be 20 meters. In some implementations, the radius may be 15 meters. In some implementations, the contained places-of-interest identifier 518 may choose a radius before identifying the contained places-of-interest. The places-of-interest points 1002 and 1003 are identified as contained places-of-interest within the rectangular building structure A 204 as illustrated in FIG. 10A. Additionally, the places-of-interest points 1001 and 1004 that are outside the rectangular building structure A 204 but within a certain radius 1005 are identified as contained places-of-interest. FIG. 10B illustrates the contained places-of-interest 1006 and 1007 for the rectangular building structure B 206. FIG. 10C illustrates the contained places-of-interest 1008, 1009, 1010 and 1011 for the Y-shaped building structure C 208. FIG. 10D illustrates the contained places-of-interest 1012, 1013, 1014, 1015, 1016 and 1017 for the L-shaped building structure D 210.

Referring to FIG. 6, at step S6.4, the regression line generator 520 of the places-of-interest hyper-locater 508 identifies one or more pieces in the contour and, for each one of the pieces, fits a regression line in the said piece. In some implementations, the regression line for an identified piece is estimated by fitting a piecewise linear function to the perimeter points in the piece. In some implementations, the regression line for an identified piece is estimated by fitting a piecewise linear function to the perimeter points and the contained places-of-interest in the piece. In some implementations, the regression line generator 520 may buffer or push the perimeter points inwards to ensure that the splines are within the contour.

In some implementations, the regression line generator 520 may identify only one piece in the contour of the building structure and estimate one regression line for the identified piece. For example, only one piece is identified for the rectangular building structure A 204 and the rectangular building structure B 206 in FIG. 11A and FIG. 11B respectively. The regression line generator 520 generates a regression line 1101 for the rectangular building structure A 204 and a regression line 1102 for the rectangular building structure B 206.

In some implementations, the regression line generator 520 may identify one or more rectangular pieces in the contour of a non-rectangular shaped building structure. In some implementations, the regression line generator 520 identifies the rectangular pieces by sampling random perimeter points within the contour and iteratively projecting line segments through some of the random perimeter points to decompose the contour into disjoint maximum-area rectangular pieces. In some implementations, the regression line generator 520 terminates identifying rectangular pieces when the combined area of the identified disjoint maximum-area rectangular pieces covers a certain percentage of the contour of the building structure. In some implementations, the coverage may be ninety-five percentages. In some implementations, the coverage may be in the range of seventy to hundred percentages.

In some implementations, the iterative projection of the line segments to define a rectangular piece produces a bounding rectangle over the piece. The regression line generator 520 calculates an area overlap between the bounding rectangle and the rectangular piece. The regression line generator 520 classifies the piece as a rectangle when the area overlap is equal to or above a threshold. In some implementations, the threshold is ninety-five percent. In some implementations, the threshold is in the range of eighty to hundred percent. In some implementations, the regression line generator 520 increases the area of the bounding rectangle until a rectangular piece is identified.

Figure 11C:
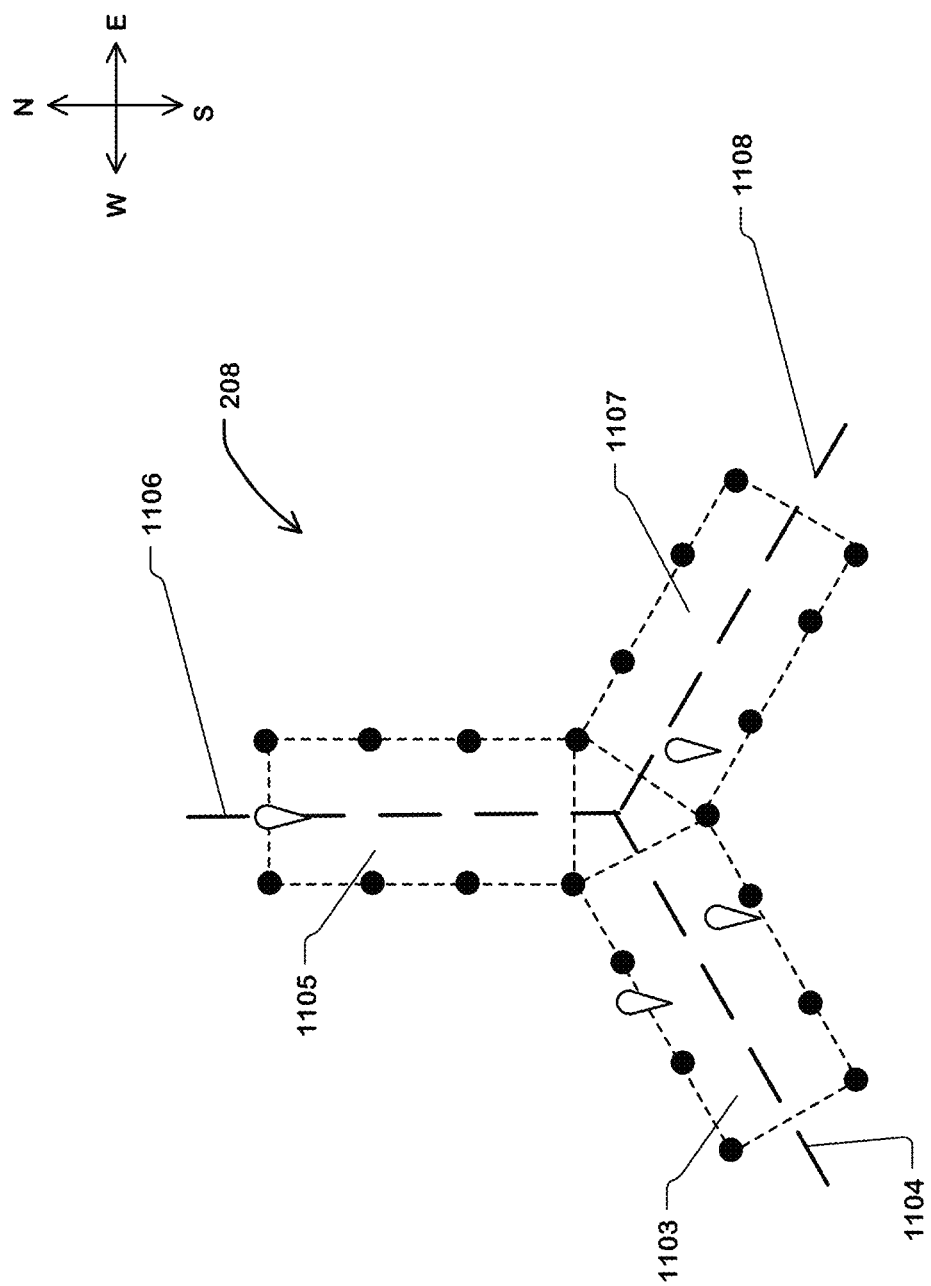

FIG. 11C illustrates three rectangular pieces 1103, 1105 and 1107 identified for the Y-shaped building structure C 208. The regression line generator 520 estimates the regression line 1104 for the rectangular piece 1103, the regression line 1106 for the rectangular piece 1105 and the regression line 1108 for the rectangular piece 1107.

Figure 11D:
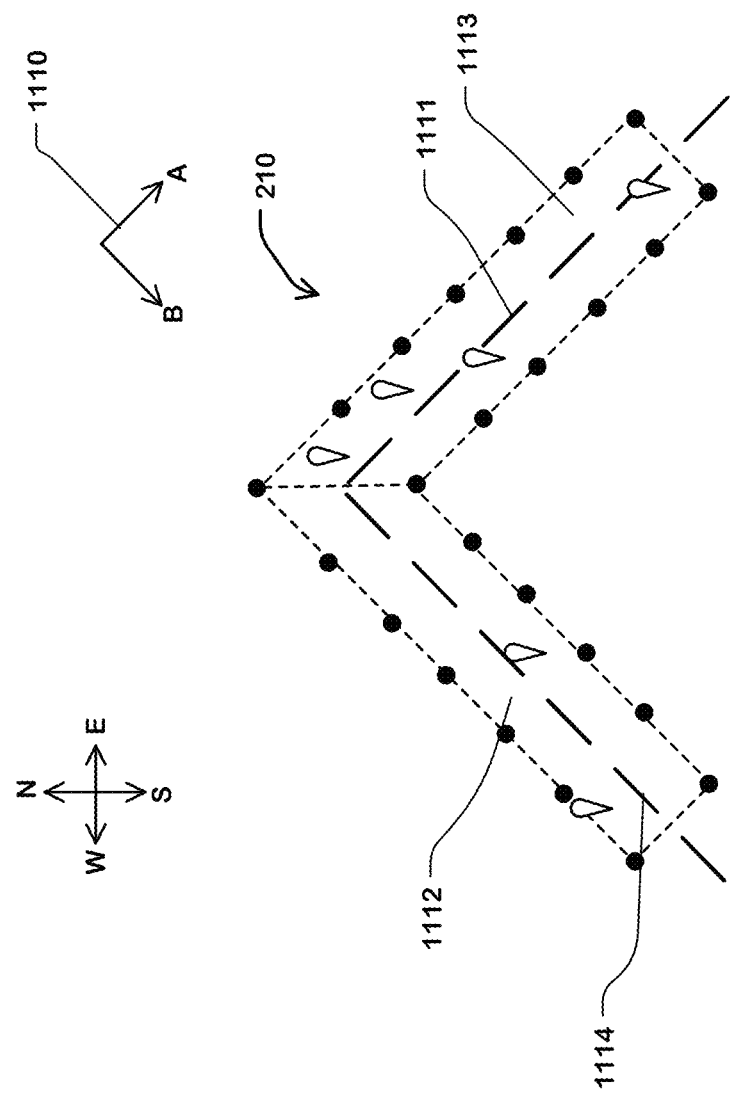

In some implementations, the regression line generator 520 may identify the principal axes of the building structure and estimate the regression line of the pieces identified within the contour of the building structure along one of the principal axes. The principal axes of the building structure can be determined from a principal component analysis of the perimeter points and/or the contained places-of-interest. FIG. 11D illustrates an example where the regression line generator 520 identifies the principal axes A and B 1110 for the L-shaped building structure D 210. The regression line generator 520 identifies two pieces 1111 and 1112 within the contour of the building and estimates the regression line 1113 for the piece 1111 along the principal axis A and the regression line 1114 for the piece 1112 along the principal axis B.

Referring to FIG. 6, at step S6.5 of the workflow 600, the adjusted places-of-interest estimator 524 of the places-of-interest hyper-locater 508 projects some or all of the contained places-of-interest onto the regression lines. During "projection," the geospatial coordinates of a contained place-of-interest is adjusted so that the geospatial coordinates fall on the nearest regression line. The adjustment is made orthogonally to the nearest regression line. A place-of-interest with adjusted geospatial coordinates is known as "adjusted" place-of-interest.

FIG. 12A illustrates the projection of the contained places-of-interest 1001, 1002, 1003 and 1004 in the building structure 204 onto the regression line 1101, creating the adjusted places-of-interest 1201, 1202, 1203 and 1204 respectively. FIG. 12B illustrates the projection of the contained places-of-interest 1006 and 1007 in the building structure 206 onto the regression line 1102, creating the adjusted places-of-interest 1206 and 1207 respectively. FIG. 12C illustrates the projection of the contained places-of-interest 1008 onto the regression line 1106, the projection of the contained places-of-interest 1009 and 1010 onto the regression line 1104, and the projection of the contained places-of-interest 1011 onto the regression line 1108 in the building structure 208. Adjusted places-of-interest 1208, 1209, 1210 and 1211 are created as a result of the projection. FIG. 12D illustrates the projection of the contained places-of-interest 1012 and 1013 onto the regression line 1114, and the projection of the contained places-of-interest 1014, 1015, 1016 and 1017 onto the regression line 1111 in the building structure 210. Adjusted places-of-interest 1212, 1213, 1214, 1215, 1216 and 1217 are created as a result of the projection.

Referring to FIG. 6, at step S6.6 of the workflow 600, the Voronoi block generator 522 of the places-of-interest hyper-locater 508 partitions the contour of the building structure into blocks or Voronoi cells by using the adjusted places-of-interest in step S6.5 as seeds. Each block is associated with a block size (i.e., area occupied by the business location represented by the place-of-interest). The Voronoi block generator 522 partitions the building contour into blocks by orthogonally projecting block boundaries between two or more adjusted places-of-interest. The Voronoi block generator 522 partitions the building contour with N adjusted places-of-interest into blocks such that each block contains exactly one adjusted place-of-interest and every adjusted point in a given block is closer to its adjusted place-of-interest than to any other adjusted place-of-interest. Various algorithms can be used to partition the building contour into blocks, such as Fortune's algorithm for generating a Voronoi diagram, Lloyd's algorithm, Linde-Buzo-Gray algorithm, Delaunay triangulation, and Bowyer-Watson algorithm, and so on.

In some implementations, the number of blocks to be partitioned is determined based on the number of contained places-of-interest inside the contour of the building structure. In some implementations, the Voronoi generator 522 may generate a block for each contained place-of-interest or some of the places-of-interest from the entire set of contained places-of-interest. In some implementations, all the partitioned blocks inside the contour of the building structure may have equal area. In some implementations, the block sizes have a minimum threshold area of hundred square meters.

FIG. 13A illustrates four blocks 1301, 1302, 1303 and 1304 partitioned in the contour of the rectangular building structure A 204 for the adjusted places-of-interest 1202, 1201, 1203 and 1204 respectively. FIG. 12B illustrates two blocks 1305 and 1306 partitioned in the contour of the rectangular building structure B 206 for the adjusted places-of-interest 1206 and 1207 respectively. FIG. 12C illustrates four blocks 1307, 1308 and 1309 partitioned in the contour of the Y-shaped building structure C 208 for the adjusted places-of-interest 1208, 1209, 1210 and 1211 respectively. FIG. 12D illustrates six blocks 1311, 1312, 1313, 1314, 1315 and 1316 partitioned in the contour of the L-shaped building structure D 210 for the adjusted places-of-interest 1212, 1213, 1214, 1215, 1216 and 1217 respectively.

Figure 14:
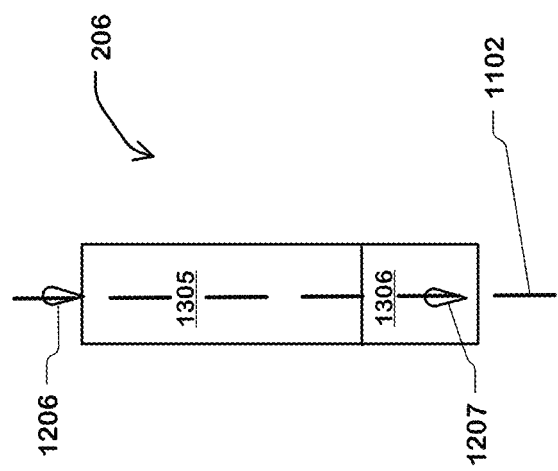

In some implementations, the Voronoi block generator 522 may identify the brand of one or more of the adjusted places-of-interest to be a recognized brand stored in the recognized brand database 506. For such adjusted places-of-interest, the building block generator 522 may adjust the block size for the said contained place-of-interest with a block size proportional to the known areas occupied by the recognized brand. FIG. 14 illustrates the adjusted block sizes of the blocks 1305 and 1306 partitioned in the contour of the rectangular building structure B 206 for the adjusted places-of-interest 1206 and 1207 respectively.

Referring to FIG. 6, at step S6.7 of the workflow 600, the places-of-interest hyper-locater 508 determines the geospatial coordinates of a centroid of a particular block based on a mean of geospatial coordinates of vertices of said block and adjusts the geospatial coordinates of the associated adjusted place-of-interest to be the geospatial coordinates of the centroid. The revised adjusted place-of-interest is known as a "hyper-located" place-of-interest. FIG. 15A illustrates the hyper-located places-of-interest 1502, 1501, 1503 and 1504 for the blocks 1301, 1302, 1303 and 1304 respectively in the rectangular building structure A 204. FIG. 15B illustrates the hyper-located places-of-interest 1506 and 1507 for the blocks 1305 and 1306 respectively in the rectangular building structure B 206. FIG. 15C illustrates the hyper-located places-of-interest 1508, 1509, 1510 and 1511 for the blocks 1307, 1308, 1309 and 1310 respectively in the Y-shaped building structure C 208. FIG. 15D illustrates the hyper-located places-of-interest 1512, 1513, 1514, 1515, 1516 and 1517 for the blocks 1311, 1312, 1313, 1314, 1315 and 1316 respectively in the L-shaped building structure D 210.

In some implementations, supplementary partitioning and attribution may be performed for places-of-interest not matched to a block.

Referring to FIG. 6, at step S6.8 of the workflow 600, the places-of-interest hyper-locater 508 stores the hyper-located places-of-interest in the hyper-located place-of-interest database 514. Each hyper-located places-of-interest entry in the database stores information for the adjusted geospatial coordinates of the place-of-interest and the shape datatypes for the associated block. The shape datatype can be in the form of Well-Known Text (WKT), GeoJSON or Shapefiles. The shape datatype includes geospatial coordinates of the at least the vertices of the block. In some implementations, the shape data type can further include geospatial coordinates for additional points along the perimeter of the block. The building block with hyper-located place-of-interest database 514 can also store one or more of the following for each hyper-located place-of-interest: a name of the adjusted place-of-interest, any recognized brand the hyper-located place-of-interest is associated with (e.g., Starbucks, Target, etc.), a category of the hyper-located place-of-interest according to the North American Industry Classification System (NAICS), a street address, a city, a state, a zip code, times of operation, a telephone number and/or a website link.

Processing of Visitor Data

Figure 16:
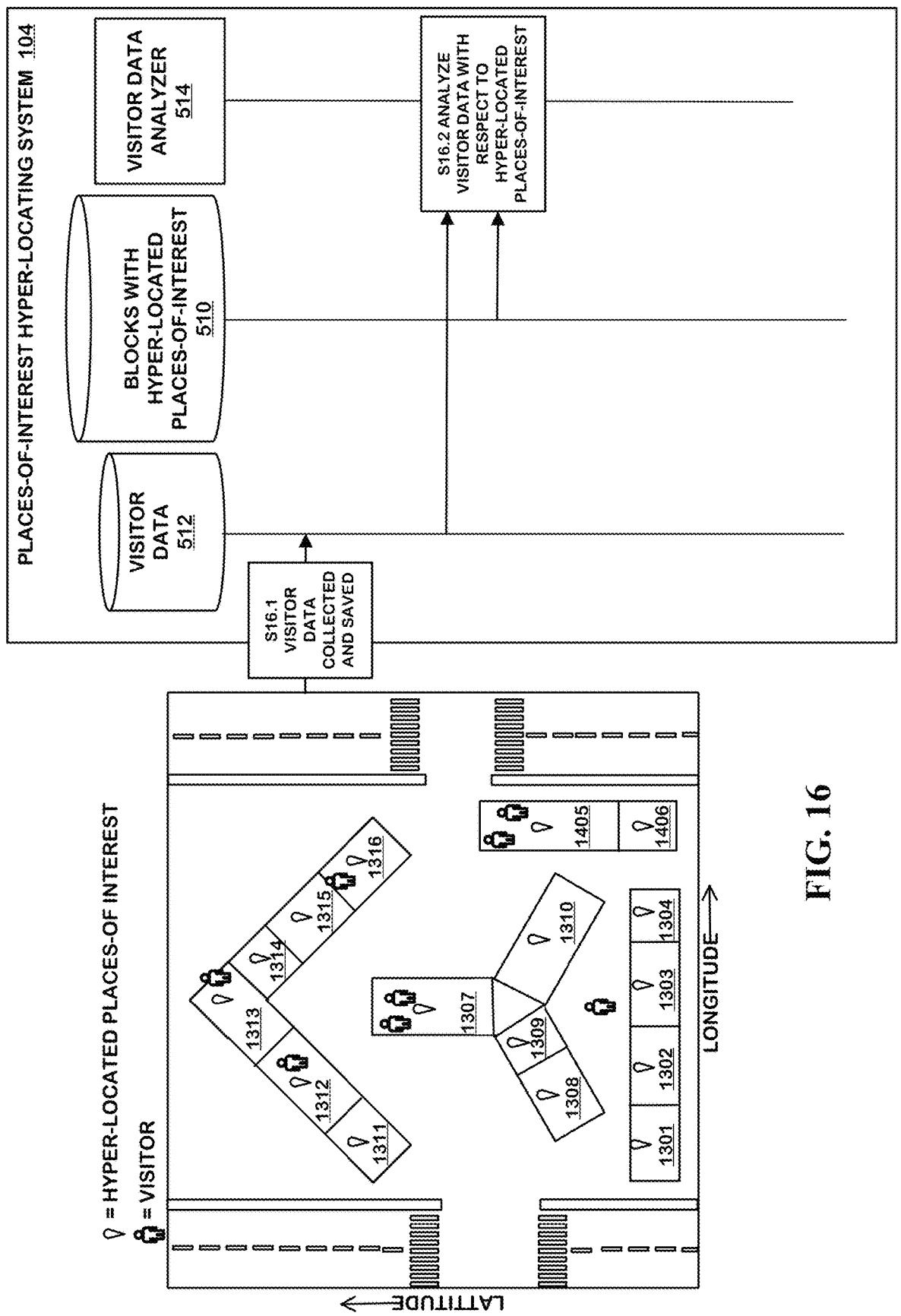
FIG. 16 is a sequence diagram illustrating a representative method of analyzing visitor data in conjunction with the adjusted places-of-interest.

FIG. 16 is a sequence diagram illustrating a representative workflow of analyzing visitor data in conjunction with the hyper-located places-of-interest by the visitor data analyzer 524 in FIG. 5. In some implementations, the actions in the workflow may be performed in different orders and/or with different, fewer or additional actions than those illustrated in FIG. 14. Multiple actions can be combined in some implementations.

The workflow begins at step S16.1 where the visitor data collected by the hyper-locating system 104 is stored in the visitor data database 512. At step S16.2, the visitor data analyzer 524 analyzes the collected location-specific visitor data from the visitor data database 512 with respect to the adjusted geospatial coordinates and defined blocks of hyper-located places-of-interest stored in the building block with hyper-located place-of-interest database 514 to discover knowledge patterns about visitors. The visitor data analyzer 524 may determine whether a visitor was inside or outside a certain building structure at a certain time on a certain date. The visitor data analyzer 524 may determine a visitor was within the boundary of the block of a particular place-of-interest at a certain time on a certain date. The visitor data analyzer 524 may determine how long a visitor stayed within the boundary of the block of a particular place-of-interest. The visitor data analyzer 524 may determine whether a visitor visited a certain building structure before/after visiting another building structure.

Some Particular Implementations

We describe systems, methods, or article of manufactures for hyper-locating places-of-interest within a building structure. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to memory. The memory stores data about building structures collected from one or more building structure sources, and data about places-of-interest collected from one or more places-of-interest sources. The memory is further loaded with computer instructions to outline a contour of the building structure based on geospatial coordinates of perimeter points of the building structure; receive preliminary geospatial coordinates of a plurality of places-of-interest and qualifying, as contained, the places-of-interest that are within the contour; fit one or more regression lines to the contained places-of-interest; generate adjusted places-of-interest by projecting the contained places-of-interest onto a nearest regression line; and feed the adjusted places-of-interest as input seeds to a Voronoi block generator to partition the building contour into blocks, each block associated with a block size; and store respective centroids of the blocks as hyper-located geospatial coordinates of the contained places-of-interest.

In some implementations, the blocks are Voronoi cells.

In some implementations, the system assigns each of the adjusted places-of-interest to a corresponding block.

In some implementations, the system estimates principal axes of the building structure determined from the principal component analysis the geospatial coordinates of the perimeter points and/or the contained places-of-interest; and divides the contour into pieces and calculating a regression line for each of the pieces along the principal axes.

In some implementations, the system includes using spatial indices for qualifying, as contained, the places-of-interest that are within the contour, wherein the qualification is parameterized by a radius around the geospatial coordinates of the perimeter points, and wherein the radius is two meters.

In some implementations, the system includes qualifying at least some of the contained places-of-interest as select places-of-interests belonging to recognized brands, and adjusts block sizes for the select places-of-interests to known areas of location units of the recognized brands.

In some implementations, each of the blocks is the same block size.

In some implementations, the block sizes have a minimum area of hundred square meters.

In some implementations, the outlining further includes sampling geospatial coordinates of additional perimeter points along the distribution of the geospatial coordinates of the perimeter points with a step size, and wherein the step size of the sampling is twenty meters.

In some implementations, the geospatial coordinates of a particular one of the centroids of a particular one of the blocks are determined based on a mean of geospatial coordinates of vertices of the particular one of the blocks.

In some implementations, the system includes selecting building structures for partitioning based on at least one of a minimum area of the building structures, geographic location of the building structures, elevation of the building structures, and a minimum number of the contained places-of-interest.

In some implementations, the system receives, from different data sources, multiple sets of geospatial coordinates of perimeter points for a particular building structure; and selects at least one set from the multiple sets for outlining the contour of the particular building structure based on trustworthiness of the sources.

In some implementations, the system includes performing supplementary partitioning for certain ones of the contained places-of-interest.

In some implementations, a count of the blocks is determined based on a count of the contained places-of-interest.

In some implementations, the system buffers outlines of the contour inwards to ensure that the regression lines are within the contour.

In some implementations, the system correlates the hyper-located geospatial coordinates of the contained places-of-interest with geospatial coordinates of visitor locations to detect visitor visits to the contained places-of-interest, to determine whether a mobile device was inside or outside of the building structure at a given timestamp, to determine whether a mobile device was inside or outside a particular contained places-of-interest at a given timestamp, to determine a duration for which a mobile device dwelled at a particular contained places-of-interest, and/or to determine that a mobile device visited a first building structure prior to visiting a second building structure.

This system implementation and other systems disclosed optionally include one or more of the following features. The system can also include features described in connection with the methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

Another system implementation of the technology disclosed includes one or more processors coupled to a memory. The memory is loaded with computer instructions to outline a contour of the building structure based on geospatial coordinates of perimeter points of the building structure; receive preliminary geospatial coordinates of a plurality of places-of-interest and qualifying, as contained, the places-of-interest that are within the contour; sample random points within the contour and iteratively projecting line segments through some of the random points to decompose the contour into disjoint maximum-area rectangles; determine a regression line for each of the rectangles; generate adjusted places-of-interest by projecting the contained places-of-interest onto a corresponding regression line; feed the adjusted places-of-interest as input seeds to a Voronoi generator and partitioning the building contour into blocks; and store respective centroids of the blocks as hyper-located geospatial coordinates of the contained places-of-interest.

In some implementations, the system may determine whether a portion of the contour outlined by the iterative projection of the line segments is a rectangle based on fitting a bounding rectangle over the portion, calculate an area overlap between the bounding rectangle and the portion, and classify the portion as the rectangle when the area overlap is equal to or above a threshold. The threshold may be in the range of fifty to ninety-five percent.

In some implementations, the system may progressively increase contour area enclosed by the portion until one of the disjoint maximum-area rectangles is outlined by the iterative projection.

In some implementations, the system may terminate the iterative projection when the contour area cumulatively enclosed by the disjoint maximum-area rectangles exceeds a threshold. The threshold may be in the range of fifty to ninety-five percent.

Other implementations may include a non-transitory computer readable storage medium storing instructions executable by a processor to perform functions of the system described above. Yet another implementation may include computer-implemented method performing the functions of the system described above.

The computer-implemented method implementation of the technology disclosed includes outlining a contour of the building structure based on geospatial coordinates of perimeter points of the building structure; receiving preliminary geospatial coordinates of a plurality of places-of-interest and qualifying, as contained, the places-of-interest that are within the contour; fitting one or more regression lines to the contained places-of-interest; generate adjusted places-of-interest by projecting the contained places-of-interest onto a nearest regression line; and feeding the adjusted places-of-interest as input seeds to a Voronoi block generator to partition the building contour into blocks, each block associated with a block size; and storing respective centroids of the blocks as hyper-located geospatial coordinates of the contained places-of-interest.

In some implementations, the blocks are Voronoi cells.

In some implementations, the computer-implemented method further comprises assigning each of the adjusted places-of-interest to a corresponding block.

In some implementations, the computer-implemented method further comprises estimating principal axes of the building structure determined from principal component analysis the geospatial coordinates of the perimeter points and/or the contained places-of-interest; and dividing the contour into pieces and calculating a regression line for each of the pieces along the principal axes.

In some implementations, the computer-implemented method further comprises using spatial indices for qualifying, as contained, the places-of-interest that are within the contour, wherein the qualification is parameterized by a radius around the geospatial coordinates of the perimeter points, and wherein the radius is two meters.

In some implementations, the computer-implemented method further comprises qualifying at least some of the contained places-of-interest as select places-of-interests belonging to recognized brands, and adjusts block sizes for the select places-of-interests to known areas of location units of the recognized brands.

In some implementations, each of the blocks is the same block size.

In some implementations, the block sizes have a minimum area of hundred square meters.

In some implementations, the outlining further includes sampling geospatial coordinates of additional perimeter points along distribution of the geospatial coordinates of the perimeter points with a step size, and wherein the step size of the sampling is twenty meters.

In some implementations, the geospatial coordinates of a particular one of the centroids of a particular one of the blocks are determined based on a mean of geospatial coordinates of vertices of the particular one of the blocks.

In some implementations, the computer-implemented method further comprises selecting building structures for partitioning based on at least one of a minimum area of the building structures, geographic location of the building structures, elevation of the building structures, and a minimum number of the contained places-of-interest.

In some implementations, the computer-implemented method further comprises receiving, from different data sources, multiple sets of geospatial coordinates of perimeter points for a particular building structure; and selecting at least one set from the multiple sets for outlining the contour of the particular building structure based on trustworthiness of the sources.

In some implementations, the computer-implemented method further comprises performing supplementary partitioning for certain ones of the contained places-of-interest.

In some implementations, a count of the blocks is determined based on a count of the contained places-of-interest.

In some implementations, the computer-implemented method further comprises buffering outlines of the contour inwards to ensure that the regression lines are within the contour.

In some implementations, the computer-implemented method further comprises correlating the hyper-located geospatial coordinates of the contained places-of-interest with geospatial coordinates of visitor locations to detect visitor visits to the contained places-of-interest, to determine whether a mobile device was inside or outside of the building structure at a given timestamp, to determine whether a mobile device was inside or outside a particular contained places-of-interest at a given timestamp, to determine a duration for which a mobile device dwelled at a particular contained places-of-interest, and/or to determine that a mobile device visited a first building structure prior to visiting a second building structure.

Computer readable media (CRM) implementations of the technology disclosed include a non-transitory computer readable storage medium impressed with computer program instructions, when executed on a processor, implement the computer-implemented method described above.

Each of the features discussed in this particular implementation section for the first system implementation applies equally to this system implementation. As indicated above, all the system features are not repeated here and should be considered repeated by reference.

Another computer-implemented method implementation of the technology disclosed includes outlining a contour of the building structure based on geospatial coordinates of perimeter points of the building structure; receiving preliminary geospatial coordinates of a plurality of places-of-interest and qualifying, as contained, the places-of-interest that are within the contour; sampling random points within the contour and iteratively projecting line segments through some of the random points to decompose the contour into disjoint maximum-area rectangles; determining a regression line for each of the rectangles; generating adjusted places-of-interest by projecting the contained places-of-interest onto a corresponding regression line; feeding the adjusted places-of-interest as input seeds to a Voronoi generator and partitioning the building contour into blocks; and storing respective centroids of the blocks as hyper-located geospatial coordinates of the contained places-of-interest.

In some implementations, the computer-implemented method further comprises determining whether a portion of the contour outlined by the iterative projection of the line segments is a rectangle based on fitting a bounding rectangle over the portion, calculate an area overlap between the bounding rectangle and the portion, and classify the portion as the rectangle when the area overlap is equal to or above a threshold. The threshold may be in the range of fifty to ninety-five percent.

In some implementations, the computer-implemented method further comprises progressively increasing contour area enclosed by the portion until one of the disjoint maximum-area rectangles is outlined by the iterative projection.

In some implementations, the computer-implemented method further comprises terminating the iterative projection when the contour area cumulatively enclosed by the disjoint maximum-area rectangles exceeds a threshold. The threshold may be in the range of fifty to ninety-five percent.

Other implementations may include a non-transitory computer readable storage medium storing instructions executable by a processor to perform functions of the system described above. Yet another implementation may include a method performing the functions of the system described above.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation, and an HBase™ or DynamoDB™ compatible non-relational database implementation.

The technology disclosed can be implemented using different programming models like MapReduce™, bulk synchronous programming, MPI primitives, etc., or different scalable batch and stream management systems like Amazon Web Services (AWS)™, including Amazon Elasticsearch Service™ and Amazon Kinesis™, Apache Storm™, Apache Spark™, Apache Kafka™, Apache Flink™, Truviso™, IBM Info-Sphere™, Borealis™, and Yahoo! S4™.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

A number of workflows illustrating logic are described herein. The logic can be implemented using processors programmed using computer programs stored in memory accessible to the computer systems and executable by the processors. With all workflows herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a re-arrangement of steps will achieve the same results only if certain conditions are satisfied. Furthermore, it will be appreciated that the workflows herein show only steps that are pertinent to an understanding of the invention, and it will be understood that numerous additional steps for accomplishing other functions can be performed before, after and between those shown.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description, it will be evident to a person skilled in the art that various modifications may be made within the scope of the invention.

The foregoing description of preferred implementations of the present invention has been provided for the purposes of illustration and description. It is not intended to be exhaustive or to limit the invention to the precise forms disclosed. Obviously, many modifications and variations will be apparent to practitioners skilled in this art. In addition, any and all variations described, suggested or incorporated by reference herein with respect to any one implementation are also to be considered taught with respect to all other implementations. The implementations described herein were chosen and described in order to best explain the principles of the invention and its practical application, thereby enabling others skilled in the art to understand the invention for various implementations and with various modifications as are suited to the particular use contemplated. It is intended that the scope of the invention be defined by the following claims and their equivalents.

We claim as follows:

1. A computer-implemented method of determining visitor behavior, the method including:
   obtaining preliminary geospatial coordinates of a plurality of contained places-of-interest that are located within boundaries of a building structure; and
   partitioning said building structure into blocks, each of said blocks including one of said contained places-of-interest and including one centroid, and having boundaries representing contours of said one of said contained places-of-interest, and wherein
   each of said blocks further including an adjusted place-of-interest, said adjusted place-of-interest corresponding to said one of said contained places-of-interest, and assigning a location to said adjusted place-of-interest that is represented by adjusted geospatial coordinates; and wherein every point within each of said blocks is closer to said adjusted place-of-interest within that block, than to any other adjusted place-of-interest within any other of said blocks; and determining hyper-located geospatial coordinates corresponding to said one of said contained places-of-interest within each one of said blocks, said hyper-located geospatial coordinates being equal to geospatial coordinates for each said one centroid of that block, and correlating (i) said contours and (ii) said hyper-located geospatial coordinates of said contained places-of-interest with geospatial coordinates of visitor locations to determine the visitor behavior of visitors visiting said contained places-of-interest, including at least one of:

detecting whether the visitors visited said contained places-of-interest, and detecting a duration for which the visitors visited said contained places-of-interest.

2. The computer-implemented method of claim 1, further including:

detecting whether the visitors were inside or outside the places-of-interest at a given timestamp.

3. The computer-implemented method of claim 2, further including:

detecting whether the visitors were inside or outside a building structure that contains the places-of-interest at a given timestamp.

4. The computer-implemented method of claim 1, further including:

detecting whether the visitors visited a first place-of-interest before visiting a second place-of-interest.

5. The computer-implemented method of claim 1, wherein said partitioning said building structure into blocks includes an action of Voronoi block generation.

6. The computer-implemented method of claim 1, wherein said assigning a location to said adjusted place-of-interest includes an action of regression line generation.

7. A system including one or more processors coupled to memory, the memory loaded with computer instructions to determine visitor behavior, the instructions, when executed on the processors, implement actions comprising:

obtaining preliminary geospatial coordinates of a plurality of contained places-of-interest that are located within boundaries of a building structure; and partitioning said building structure into blocks, each of said blocks including one of said contained places-of-interest and including one centroid, and having boundaries representing contours of said one of said contained places-of-interest, and wherein each of said blocks further including an adjusted place-of-interest, said adjusted place-of-interest corresponding to said one of said contained places-of-interest, and assigning a location to said adjusted place-of-interest that is represented by adjusted geospatial coordinates; and wherein every point within each of said blocks is closer to said adjusted place-of-interest within that block, than to any other adjusted place-of-interest within any other of said blocks; and determining hyper-located geospatial coordinates corresponding to said one of said contained places-of-interest within each one of said blocks, said hyper-located geospatial coordinates being equal to geospatial coordinates for each said one centroid of that block, and correlating (i) said contours and (ii) said hyper-located geospatial coordinates said contained places-of-interest with geospatial coordinates of visitor locations to determine the visitor behavior of visitors visiting said places-of-interest, including at least one of detecting whether the visitors visited said contained places-of-interest, and detecting a duration for which said visitors visited said contained places-of-interest.

8. The system of claim 7, implementing actions further comprising:

detecting whether the visitors were inside or outside the places-of-interest at a given timestamp.

9. The system of claim 8, implementing actions further comprising:

detecting whether the visitors were inside or outside a building structure that contains the places-of-interest at a given timestamp.

10. The system of claim 7, implementing actions further comprising:

detecting whether the visitors visited a first place-of-interest before visiting a second place-of-interest.

11. The system of claim 7, wherein said partitioning said building structure into blocks includes an action of Voronoi block generation.

12. The system of claim 7, wherein said assigning a location to said adjusted place-of-interest includes an action of regression line generation.

13. A non-transitory computer readable storage medium impressed with computer program instructions to determine visitor behavior, the instructions, when executed on a processor, implement a method comprising:

obtaining preliminary geospatial coordinates of a plurality of contained places-of-interest that are located within boundaries of a building structure; and partitioning said building structure into blocks, each of said blocks including one of said contained places-of-interest and including one centroid, and having boundaries representing contours of said one of said contained places-of-interest, and wherein each of said blocks further including an adjusted place-of-interest, said adjusted place-of-interest corresponding to said one of said contained places-of-interest, and assigning a location to said adjusted place-of-interest that is represented by adjusted geospatial coordinates; and wherein every point within each of said blocks is closer to said adjusted place-of-interest within that block, than to any other adjusted place-of-interest within any other of said blocks; and determining hyper-located geospatial coordinates corresponding to said one of said contained places-of-interest within each one of said blocks, said hyper-located geospatial coordinates being equal to geospatial coordinates for each said one centroid of that block, and correlating (i) said contours and (ii) said hyper-located geospatial coordinates of said contained places-of-interest with geospatial coordinates of visitor locations to determine the visitor behavior of visitors visiting said contained places-of-interest, including at least one of detecting whether the visitors visited said contained places-of-interest, and detecting a duration for which the visitors visited said contained places-of-interest.

14. The non-transitory computer readable storage medium of claim 13, implementing the method further comprising:

detecting whether the visitors were inside or outside the places-of-interest at a given timestamp.

15. The non-transitory computer readable storage medium of claim 14, implementing the method further comprising:

detecting whether the visitors were inside or outside a building structure that contains the places-of-interest at a given timestamp.

16. The non-transitory computer readable storage medium of claim 13, implementing the method further comprising:
detecting whether the visitors visited a first place-of-interest before visiting a second place-of-interest.

17. The non-transitory computer readable storage medium of claim 13, wherein said partitioning said building structure into blocks includes an action of Voronoi block generation.

18. The non-transitory computer readable storage medium of claim 13, wherein said assigning a location to said adjusted place-of-interest includes an action of regression line generation.

* * * * *